(12) United States Patent
Hui et al.

(10) Patent No.: US 6,493,088 B1
(45) Date of Patent: Dec. 10, 2002

(54) METHOD AND APPARATUS FOR HIGH RESOLUTION MONITORING OF OPTICAL SIGNALS

(75) Inventors: Rongqing Hui, Lawrence, KS (US); Maurice S. O'Sullivan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/411,649

(22) Filed: Oct. 4, 1999

(51) Int. Cl.[7] .................................................. G01B 9/02
(52) U.S. Cl. ....................................... 356/450; 359/110
(58) Field of Search ........................... 356/450; 359/110

(56) References Cited

U.S. PATENT DOCUMENTS

2001/0026385 A1 * 10/2001 Cao ............................ 359/124

* cited by examiner

*Primary Examiner*—Frank G. Font
*Assistant Examiner*—Phil Natividad

(57) ABSTRACT

The present invention provides a method and apparatus for monitoring optical signals with an expand frequency resolution. The invention permits high-resolution measurements of optical signal spectrums while retaining wide bandwidth operation through appropriate control circuitry. An interferometer having a periodic frequency response formed of equally spaced narrow-band peaks is used to sweep the entire signal spectrum. The interferometer frequency response is incrementally tuned in cycles so that each of its frequency response peaks cyclically scans a particular spectral band of the signal spectrum. During each cycle, the interferometer isolates multiple,spectrally resolved portions of the optical signal spectrum where each portion originates frog different spectral band. In this way, a high-resolution measurement of the entire signal spectrum can be obtained. The invention may be network protocol independent and can be incorporated into an optical spectrum analyzer or directly into any optical terminal. The invention can be used for signal spectrum monitoring applications including link quality monitoring (LQM) in optical communications networks to monitor various transmission parameters such as such as carrier wavelengths, optical signal-to-noise ratios (SNR), amplified spontaneous emissions (ASE), noise levels, optical non-linearities or other signal baseband information such as data rates and formats.

45 Claims, 12 Drawing Sheets

METHOD AND APPARATUS FOR HIGH RESOLUTION MONITORING OF OPTICAL SIGNALS

FIELD OF THE INVENTION

The present invention relates generally to methods and apparatuses for monitoring optical signals, and more particularly to the monitoring of optical signals with an improved frequency resolution.

BACKGROUND OF THE INVENTION

In a typical fiber optic transmission network such as, for example, a wavelength division multiplexed (WDM) network information is transported between optical terminals by optical fiber links characterized with optical channels operating at distinct wavelengths. The use of optical fibers to carry information substantially increases the distance separating optical network terminals. However, standard optical terminal interconnections are nevertheless limited by a number of factors including the optical power that can be launched into the interconnecting fibers, fiber loss, fiber dispersion and the sensitivity of optical receivers used in the optical terminals.

Where the distance between desired end points of an optical fiber transmission network exceeds the maximum distance between optical terminals over which information can be reliably transmitted, transit terminals such as opto-electronic repeaters and optical amplifiers are commonly used along the transmission path for signal amplification and regeneration. Typically, these transit terminals are placed between fiber spans that can each extend from 40 to 100 km.

In most systems, the performance of this transit equipment must be monitored so that faults in operation of the optical transmission network can be isolated. This monitoring, typically referred to as link quality monitoring (LQM), helps determining whether a particular network is within specified performance requirements.

In order to effectively LQM an optical transmission network, it is well known to monitor and administrate the transmission of information in each fiber on a per-channel basis by using a small portion of the available channel bandwidth in the fiber to transmit a low frequency, low amplitude dither signal. According to this method, each channel signal is modulated before transmission with an amplitude dither signal. At a transit terminal receiver, the embedded dither signal is recovered by correlation with known dithering sequences.

As is well known, the recovered dither signal in each channel can assist in monitoring various transmission parameters downstream from the point of transmission. For example, the dither can provide a downstream estimation of the optical signal power received from a particular optical channel, assist in determining the optical signal-to-noise ratio (SNR) of a particular channel signal or provide an indication as to whether a channel signal is present in a particular channel.

Presently, in order to retrieve the dither from an optical channel signal, the optical channel signal (or a portion thereof) must first be demodulated and converted into an electric form before any manipulation of the dither information can be carried out. Unfortunately however, this would dramatically increase the cost of monitoring data transmission. As optical technology evolves toward all optical networking, there will be a need to monitor optical channel signals optically at various points without having to do a complete optical channel demodulation.

However, a high modulation depth for the dither reduces the signal-to-noise ratio (SNR) of the channel signal and results in a substantial degradation of the system's performance. Without a higher modulation depth, transmission monitoring over distances extending beyond 7 spans cannot be carried out with sufficient accuracy. With a higher modulation depth, the transmission of information over these long distances can be more effectively monitored but channel signal SNRs may as a result be detrimentally affected causing a significant degradation in performance. As the distance between desired end points in an optical fiber transmission network can generally exceed 7 spans, it would be desirable to increase the distances over which data transmissions can be reliably monitored without causing any penalty in performance.

These limitations have led to the development of all-optical monitoring techniques which are typically embodied into optical spectrum analyzers. With conventional optical spectrum analyzers, the transmission of information in a fiber can also be monitored on a per-channel basis. Typically, the optical channel signal is travelling in the fiber are optically separated and their respective optical intensity is measured to determine the amount of light propagating in each channel. By measuring the optical intensity of each channel signal, several channel transmission parameters can be monitored including the optical channel signal power, the channel SNR and the amplified spontaneous emissions (ASE) present in each channel. Contrary to dithering techniques, these channel parameters can be measured without requiring any signal demodulation and without relying on a pre-knowledge of dither information placed on each channel signal.

There are many types of optical spectrum analyzers which are known in the art. Conventional optical spectrum analyzers typically provide a wide spectrum range and often include a dispersive element such as a Bragg cell with an array of photo-detectors. A tunable dispersive element with a single photo-detector is also commonly used. With these key components, conventional optical spectrum analyzers can monitor many channel signals over a relatively large bandwidth by tuning the dispersive element to repeatedly sweep along the optical spectrum and measure the optical light as a function of wavelength.

However, the frequency resolution conventionally achieved is quite low. Apart from the large size and low sweeping speed which is limited by the mechanical tuning of the dispersive element, the maximum resolution bandwidth of known spectrum analyzers is typically in the order of 10 GHz. Unfortunately, this resolution is not adequate to monitor closely spaced channels or distinguish between different types of optical traffic.

Various attempts have been made to improve the existing resolution. However, most of these attempts have been very expensive or have created other problems in the signal processing operation. For example, in the past, it has been attempted to improve the frequency resolution of the system by increasing the length of the Bragg cell in order to extend the frequency resolution. However, this approach is not especially productive inasmuch as the extended length of the Bragg cell has the inherent effect of substantially attenuating the optical fiber signal which is supplied thereto whereby distortion of the optical output frequency signal is produced. Also, in many systems, such elongated Bragg cells become very expensive, delicate to handle, and hard to package.

SUMMARY OF THE INVENTION

The present invention addresses these issues and to this end provides a methodology and apparatus to mitigate the present limitations in this art.

The present invention provides a method and apparatus for monitoring optical signals with an expanded frequency resolution. The invention permits high-resolution measurement of optical signal spectrums while retaining wide bandwidth operation through appropriate electronic control circuitry.

In order to achieve high resolution in monitoring a particular optical signal, the invention uses an interferometer to sweep the entire signal spectrum. As is well known, the interferometer has a periodic transfer function which consists of equally spaced narrow-band peaks each tunable to a particular narrow-band wavelength range. According to the invention, the interferometer frequency response is incrementally tuned in cycles so that each of its frequency response peaks cyclically scans a particular spectral band. During each cycle, the interferometer isolates multiple spectrally resolved portions of the optical signal spectrum where each portion originates from a different spectral band. By operating the interferometer to scan each band completely, a high-resolution measurement of the entire signal spectrum can be obtained.

In order to adequately process the spectrally resolved portions and obtain a complete spectral measurement of the incoming optical signal, the spectrally resolved portions are separated in the space domain as a function of wavelength. According to the invention, different methods can be used to space domain separate the spectrally resolved portions of the signal spectrum. For example, this can be accomplished by first separating the incoming optical signal spectrum into the different wavelength regions or bands to be scanned with an array of optical filters and then sequentially applying the bands separated to a scanning interferometer. Alternatively, instead of separating the incoming signal spectrum into bands before any interferometry is applied, interferometry could be applied to the incoming signal first to produce spectrally resolved portions of the signal spectrum and then separating the portions obtained in the space domain with the array optical filters.

According to the invention, the spectrally resolved portions can also be separated in the time domain as a function of time. For example, this can be accomplished by coupling the optical signal to wavelength-dependent delay lines for time-delaying the signal spectrum in bands as a function of wavelength and sequentially passing the time-delayed bands into the interferometer to produce the spectrally resolved portions in sequence.

The invention can be advantageously incorporated into an optical spectrum analyzer or directly into any optical terminal and used for link quality monitoring (LQM) in optical communications networks.

In contrast to conventional dithering methods used for LQM, the invention advantageously enables the optical monitoring of an extended range of transmission parameters including carrier wavelengths, optical SNRs, ASE noise levels, optical non-linearities or other signal baseband information such as data rates and formats.

Another advantage of the invention over dithering as a means for monitoring transmission is that the invention is protocol and vendor independent which substantially reduces the complexity of the LQM signal processing required in each optical terminal.

Another advantage of the invention over dithering is that data transmissions can be reliably monitored over greater distances.

The invention also advantageously provides a much higher resolution than that provided by conventional optical spectrum analyzers. With this higher resolution, closely spaced channels and optical streams operating at different speeds can be more comprehensively monitored.

Another advantage of the invention over conventional optical spectrum analyzers is that the use of a scanning interferometer substantially improves the speed of acquisition.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

The present invention provides methods and apparatuses for monitoring optical signals with an expanded frequency resolution. The invention permits high-resolution measurements of optical signal spectrums while retaining wide bandwidth operation through appropriate electronic control circuitry.

In order to achieve high resolution in monitoring a particular optical signal, the invention uses a scanning interferometer to sweep the entire signal spectrum. As is well known, the interferometer has a periodic transfer function that consists of equally spaced narrow-band peaks each tunable to a particular narrow-band wavelength range. With this periodic frequency response, the interferometer can be used to isolate a series of equally spaced, spectrally resolved portions of the signal spectrum.

Figure 1:
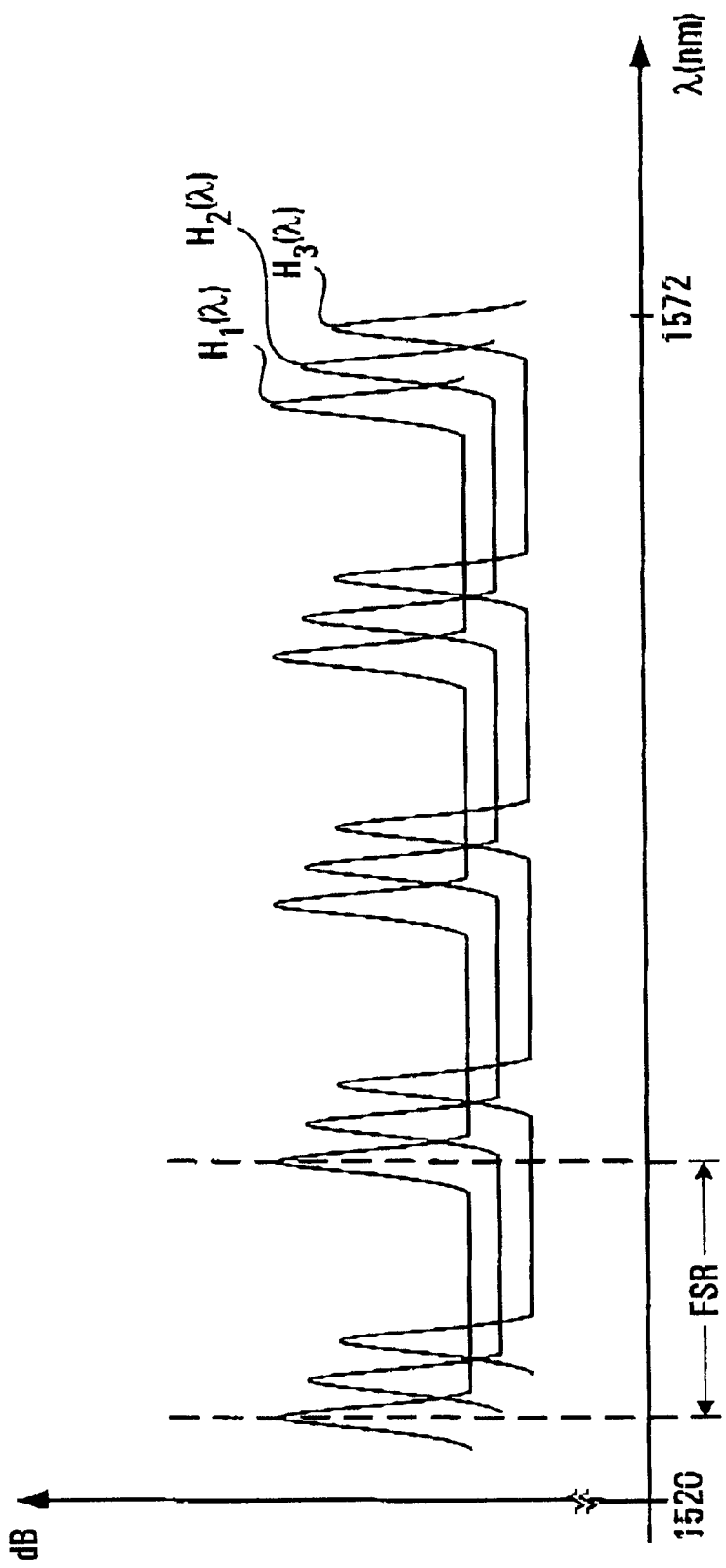
FIG. 1 shows three wavelength plots of a typical interferometer transfer function denoted by $H_1(\lambda)$, $H_2(\lambda)$ and $H_3(\lambda)$.

Referring to FIG. 1, there is illustrated three wavelength plots of a typical interferometer transfer function with a specified period of free spectral range (FSR) shown in reference to a 52 nanometer (nm) optical bandwidth extending from 1520 nm to 1572 nm. These plots are respectively denoted by $H_1(\lambda)$, $H_2(\lambda)$ and $H_3(\lambda)$. It can be observed from these plots $H_1(\lambda)$, $H_2(\lambda)$, $H_3(\lambda)$ that the interferometer transfer function consists of a series of N equally spaced narrow-band peaks (only 5 shown) each tunable to a particular narrow-band wavelength range. The plots $H_1(\lambda)$, $H_2(\lambda)$ and $H_3(\lambda)$ are collectively representative of how the interferometer transfer function can be tuned to isolate different series of spectrally resolved portions of an optical signal spectrum.

By operating the interferometer to isolate different series (such as shown in $H_1(\lambda)$, $H_2(\lambda)$ and $H_3(\lambda)$ of spectrally resolved portions of the optical signal spectrum, a high resolution measurement of the entire signal spectrum can be obtained. In order to do this, the interferometer is cyclically tuned such that each interferometer frequency response peak continuously scans a particular range of wavelengths, preferably at least equal to the interferometer FSR. By combining the wavelength regions swept, a high-resolution measurement of the entire signal spectrum can be assembled.

In order to comprehensively measure the spectrum of an incoming optical signal, each spectrally resolved portion produced by the interferometer must be isolated. As noted above, when an incoming optical signal is applied to an interferometer, the interferometer produces an output signal which contains a series of spectrally resolved portions of the incoming signal spectrum where each portion originates from a different wavelength region. The spectrally resolved portions of the incoming signal spectrum contained in the interferometer output signal cannot be properly processed unless they are separated first.

There are many ways by which spectrally resolved portions of an incoming signal spectrum can be separated. For example, the spectrally resolved portions can be separated in the space domain as a function of wavelength or alternatively, in the time domain as a function of time. The following section will now describe a number of preferred embodiments and methods of the invention by which spectrally resolved portions of an incoming signal spectrum can be space-domain separated. This will be followed by a description of other preferred embodiments and methods by which spectrally resolved portions can be separated in the time domain.

According to the invention, there are many ways by which spectrally resolved portions of an incoming signal spectrum can be space-domain separated. For example, this can be accomplished by first separating the incoming optical signal spectrum into the different wavelength regions to be scanned (hereinafter also referred to as "bands") and then sequentially applying the bands separated to a scanning interferometer. As will be explained below in further detail, by separating the incoming signal spectrum into a number of bands first and sequentially applying the bands separated to the interferometer, only one spectrally resolved portion from a particular region of the signal spectrum is produced at a time and the spectrally resolved portions produced from each wavelength region can, as a result, be processed separately.

Figure 2:
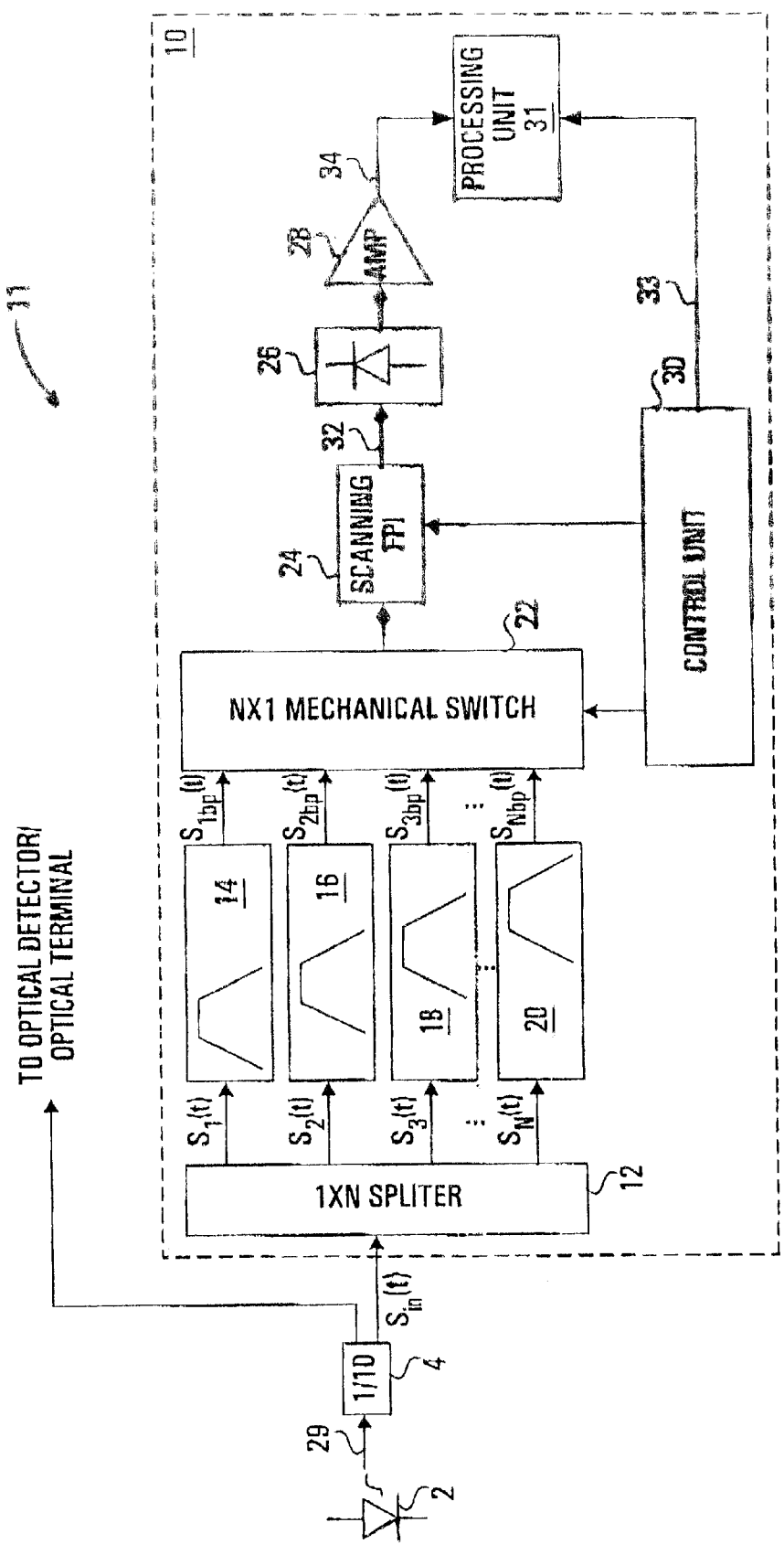
FIG. 2 shows an optical spectrum analyzer according to a preferred embodiment of the invention featuring a Febry-Perot interferometer (FPI) and a mechanical switch for monitoring an optical signal.

Referring now to FIG. 2, there is illustrated a preferred embodiment of the invention where the spectrum of an incoming optical signal 29 is first separated into bands before being applied to a scanning Febry-Perot interferometer (FPI) 24. For the purpose of example, the preferred embodiment of the invention shown in this figure is incorporated into an optical spectrum analyzer generally indicated by 10 which is used in an optical terminal 11 for monitoring the transmission of the incoming optical signal 29.

The optical signal is typically generated in a remote optical transmitter illustrated in FIG. 2 as a light source 2, and transmitted to the optical terminal 11 via a fiber link 29. At the optical terminal 11, the optical spectrum analyzer 10 is coupled to the fiber link 29 via a fiber coupler 4 to tap a suitable amount of optical signal power. This could be, for example, 10% of the available optical power while the remainder portion (e.g. 90%) may be transmitted through to its intended destination which may be a neighboring detector (not shown) within the optical terminal 11 or alternatively another downstream optical terminal (not shown). For clarity, the optical signal power tapped in the coupler 4 is hereinafter defined as the optical signal received in the optical spectrum analyzer 10 and is denoted by $S_{in}(t)$.

In order to separate the $S_{in}(t)$ spectrum into a number of spectral bands, the optical spectrum analyzer 10 has an array of N interference filters 14, 16, 18, 20 (only 4 shown) connected to receive the incoming optical signal $S_{in}(t)$ through a 1×N power splitter 12. The interference filters 14, 16, 18, 20 are optical band pass filters designed to a particular wavelength band of the $S_{in}(t)$ spectrum. FIG. 2 illustrates an example where 4 interference filters (N=4) are used to cover the $S_{in}(t)$ spectrum. Although this figure only shows 4 filters 14, 16, 18, 20 each designed with a particular pass band, it is to be noted that any number of filters with different pass bands can be used provided their pass bands combined fully cover the entire $S_{in}(t)$ spectrum. As will be explained below in further detail, these filters 14, 16, 18, 20 are designed with partially overlapping wavelength pass bands to ensure a complete coverage of the entire optical signal $S_{in}(t)$ spectrum for continuous spectrum monitoring.

Instead of using separate filters such as the filters 14, 16, 18, 20, other types of optical filtering devices could also be used. For example, wavelength division multiplexed (WDM) demultiplexers could alternatively be used to separate the $S_{in}(t)$ spectrum. In this situation however, at least two WDM demultiplexers with complimentary pass bands would have to be used to ensure that the WDM filtering bands used for separating the $s_{in}(t)$ spectrum fully cover the entire $s_{in}(t)$ spectrum. For example, in order to separate the $S_{in}(t)$ spectrum into N bands, two 1:N/2 WDM demultiplexers designed with complimentary pass bands would have to be used. It will become apparent that if WDM multiplexers are used instead of separate optical filters, a power splitter having a reduced number of outputs will have to be used. Accordingly, if two 1:N/2 WDM demultiplexers are used, the 1:N power splitter 12 would have to be replaced by a 1:2 power splitter.

According to the invention, the spectrum range provided by the optical spectrum analyzer 11 can be expanded in various ways. For example, the spectrum range can be expanded by increasing the number of filters 14, 16, 18, 20 used or increasing the pass band of each filter 14, 16, 18, 20 and the FSR period of the FPI 24. If WDM demultiplexers are used instead of separate optical filters, another way to extend the measurable spectrum range is to increase the number of WDM demultiplexers used or use different WDM demultiplexers featuring a higher number of outputs. For clarity, and simplicity, it is hereinafter assumed that only four filters 14, 15 16, 18, 20 are used to separate the $S_{in}(t)$ spectrum and that these filters are separate optical band pass filters.

The filters 14, 16, 18, 20 are connected to the scanning FPI 24 through a N×1 mechanical switch 22. The FPI 24 and the N×1 switch 22 are controlled by an electrical control unit 30. The FPI 22 produces an optical signal denoted by 32 which is coupled to a photo-detector 26. The photo-detector 26 converts the FPI output signal 32 into an electrical form to produce after amplification in an amplifier 28 an electrical signal 34. This electrical signal 34 is fed into a processing unit 31. The processing unit 31 is coupled to receive a sampling signal 33 from the control unit 30 for sampling the electrical signal 31 and produce a high-resolution measurement of the entire $S_{in}(t)$ spectrum.

In operation, the optical signal power tapped in the coupler 4 and carried by $s_{in}(t)$ is received in the optical spectrum analyzer 10 in the 1×N splitter 12. The 1×N splitter 12 functions to divide the $s_{in}(t)$ optical signal power equally to form N optical signals, $S_1(t)$, $S_2(t)$, $S_3(t)$, $S_N(t)$ which are respectively coupled to the interference filters 14, 16, 18, 20. By operation of these filters 14, 16, 18, 20, each optical signal $S_1(t)$, $S_2(t)$, $S_3(t)$, $S_N(t)$ is band pass filtered at a particular pass band to produce a respective band pass filtered signal $S_{1bp}(t)$ $S_{2bp}(t)$, $S_{3bp}(t)$, $S_{Nbp}(t)$. As a result of the filtering, the $S_{in}(t)$ signal spectrum is separated into N partially overlapping wavelength bands where each band is carried by a respective signal $s_{1bp}(t)$, $S_{2bp}(t)$, $S_{3bp}(t)$, $S_{Nbp}(t)$.

Once the $s_{in}(t)$ signal has been split into N optical signals $S_{1bp}(t)$, $S_{2bp}(t)$, $S_{3bp}(t)$, $S_{4bp}(t)$ causing the $S_{in}(t)$ spectrum to be separated into N spectral bands, the switch 22 operates to sequentially couple each signal $S_{1bp}(t)$, $S_{2bp}(t)$, $S_{3bp}(t)$, $s_{Nbp}(t)$ to the scanning FPI 24 so that the spectrally resolved portions of the $S_{in}(t)$ spectrum isolated by the FPI 24 are produced in sequence. It will be recalled that the scanning FPI 24 has a periodic transfer function that consists of a series of N equally spaced narrow-band peaks where each peak is tunable to a particular narrow-band wavelength range. According to the invention, the FPI 24 is designed with an appropriate FSR (further details below) such that each band only has one peak located therein. By sequentially coupling each signal $S_{1bp}(t)$, $S_{2bp}(t)$, $S_{3bp}(t)$, $S_{Nbp}(t)$ to the FPI 24, only one band of the $S_{in}(t)$ spectrum is coupled thereto at a time and therefore only one spectrally resolved portion of the $S_{in}(t)$ spectrum will be produced at a time by the FPI 24.

The switch 22 is operated by the control unit 30 to sequentially couple each signal $S_{1bp}(t)$, $S_{2bp}(t)$, $S_{3bp}(t)$, $S_{Nbp}(t)$ to the FPI 24 which, as a result, sequentially produces in the optical signal 32 a series of spectrally resolved portions of the $S_{in}(t)$ spectrum where each portion produced is from a different spectral band.

By operation of the FPI 24, the optical signal 32 sequentially contains the isolated series of spectrally resolved portions of the $S_{in}(t)$ spectrum. In order to dispose of a sufficient amount of data to construct a high-resolution measurement of the entire $S_{in}(t)$ spectrum, the FPI 24 is incrementally tuned by the control unit 30 to isolate enough series (such as shown in $H_1(\lambda)$, $H_2(\lambda)$ and $H_3(\lambda)$ of FIG. 1) of spectrally resolved portions of the $S_{in}(t)$ spectrum to completely cover each band and hence, the entire $S_{in}(t)$ spectrum (further details below).

For each FPI tuning increment, the switch 22 is operated by the control unit 30 to sequentially couple each signal $S_{1bp}(t)$, $S_{2bp}(t)$, $S_{3bp}(t)$, $S_{Nbp}(t)$ to the FPI 24 which, as a result, sequentially produces in the optical signal 32 enough series of spectrally resolved portions of the $S_{in}(t)$ spectrum to completely cover the entire $S_{in}(t)$ spectrum.

According to the invention, the incremental tuning of the FPI 24 is repeated in cycles (hereinafter also referred to as "scan cycles) for scanning each band of the $S_{in}(t)$ spectrum cyclically and provide continuous monitoring of the entire spectrum. The manner in which the FPI frequency response is incrementally tuned in cycles is further described below in reference to FIGS. 6, 7A, 7B, 7C, 8, 9A and 9B.

During each scan cycle, the optical signal 32 carries spectrally resolved portions of the $S_{in}(t)$ spectrum in sequence. The spectrally resolved portions of the $S_{in}(t)$ spectrum carried by the optical signal 32 are then photo-detected by the photo-detector 26 and amplified in the amplifier 28 to produce the electrical signal 34. By operation of the sampling signal 33 provided by the control unit 30, the electrical signal 34 is sampled in the processing unit 31 to digitize, record and combine the spectrally resolved portions of the $S_{in}(t)$ spectrum so that the entire $S_{in}(t)$ spectrum can be constructed. The sampling signal 33 is further described below in reference to FIGS. 6, 7A, 7B, 7C, 8, 9A and 9B.

Figure 3:
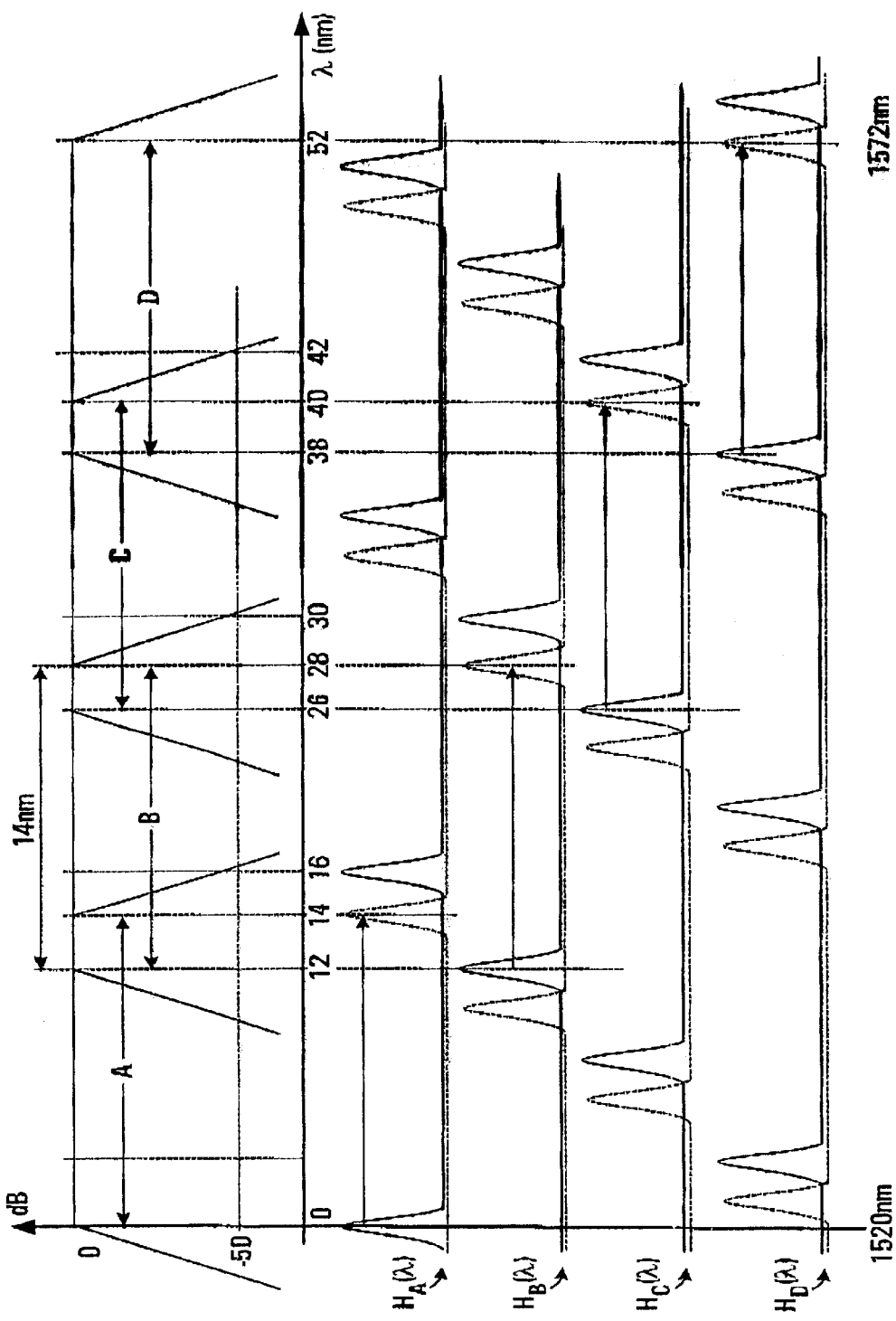
FIG. 3 shows a wavelength diagram of a 52 nm optical signal spectrum extending from 1520 nm to 1572 nm and four wavelength plots $H_A(\lambda)$, $H_B(\lambda)$, $H_C(\lambda)$ and $H_D(\lambda)$ of the FPI frequency response of the FPI of FIG. 2.

To further illustrate the space domain separation of the $S_{in}(t)$ signal spectrum by the optical filters 14, 16, 18, 20 and the cyclical scanning of its constituent bands by the FPI 24, reference is now made to FIG. 3 where there is shown as an example a wavelength diagram of a 52 nm $S_{in}(t)$ signal spectrum extending from 1520 nm to 1572 nm and separated into four 14 nm partially overlapping bands (N=4) respectively denoted in FIG. 3 as A, B, C and D. In this particular example, band A extends from 1520 nm to 1534 nm, band B extends from 1532 nm to 1548 nm, band C extends from 1546 nm to 1560 nm and band D extends from 1558 nm to 1572 nm. The overlap between adjacent bands can be used for calibration in the processing unit 31 (see FIG. 2) for combining the spectrally resolved portions produced by the FPI 24 together to ensure a complete coverage and accurate construction of the entire $S_{in}(t)$ spectrum. In this particular example, the band overlap is shown set to 2 nm.

The space domain separation of the $s_{in}(t)$ signal spectrum into these 4 bands A, B, C, D is assumed to be performed by the optical filters 14, 16, 18, 20 of FIG. 2. For the purpose of example, the optical filters 14, 16, 18, 20 are assumed to be characterized by a 50 dB/2 nm stop band and a 14 nm pass band which respectively extend from 1520 nm to 1534 nm, 1532 nm to 1548 nm, 1546 nm to 1560 nm and 1558 nm to 1572 nm.

This figure also shows referenced to these bands A, B, C, D, four wavelength plots $H_A(\lambda)$, $H_B(\lambda)$, $H_C(\lambda)$ and $H_D(\lambda)$ of the FPI frequency response illustrating the wavelength timing of the FPI response for scanning of each band A, B, C, D to produce multiple spectrally resolved portions of the $S_{in}(t)$ spectrum. More specifically, each plot $H_A(\lambda)$, $H_B(\lambda)$, $H_C(\lambda)$ and $H_D(\lambda)$ illustrates the wavelength placement of the FPI frequency response along the $S_{in}(t)$ signal spectrum as the FPI 24 begins to scan (full line) and completes the scanning (dotted line) of a respective band A, B, C, D.

The separation of the incoming $S_{in}(t)$ signal spectrum into the bands A, B, C, D and sequential processing of the bands A, B, C, D by the FPI 24 illustrated in FIG. 3 is only a particular example showing how the spectrally resolved portions of the incoming $S_{in}(t)$ spectrum produced by the FPI 24 can be space domain separated. According to the invention, other methods for space domain separating the spectrally resolved portions produced by the FPI 24 may also be used.

For example, instead of separating the incoming $S_{in}(t)$ signal spectrum into bands before any interferometry is applied to the $S_{in}(t)$ signal (as shown in FIG. 2), interferometry could be applied to the incoming $S_{in}(t)$ signal first to produce spectrally resolved portions of the $S_{in}(t)$ signal spectrum and these portions could then be subsequently separated in the space domain with an array of optical filters. This is what is illustrated in FIG. 4.

Figure 4:
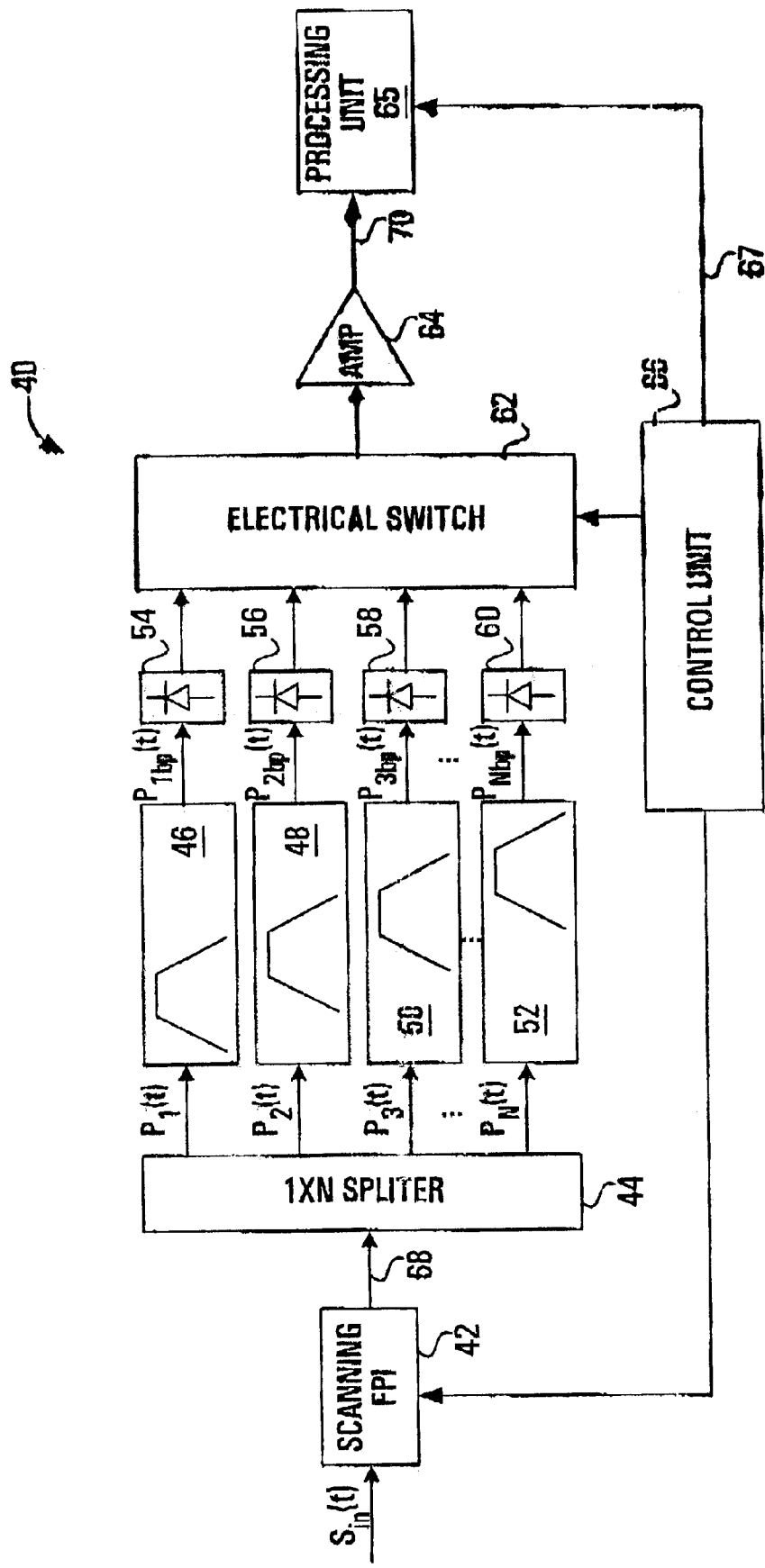
FIG. 4 shows an optical spectrum analyzer according to another preferred embodiment of the invention featuring a FPI and multiple photo-diodes.

Referring now to FIG. 4, the incoming signal $S_{in}(t)$ is first applied to an FPI 42 to produce spectrally resolved portions of the $S_{in}(t)$ spectrum which are then subsequently separated in the space domain with an array of N filters 54, 56, 58, 60 (only 4 shown). Similarly to the embodiment shown in FIG. 2, this particular embodiment of the invention is also incorporated into an optical spectrum analyzer generally indicated by 40.

The optical spectrum analyzer 40 is coupled to receive the incoming signal $S_{in}(t)$ into the FPI 42 controlled by a control unit 66 to produce an optical signal 68 whose spectrum consists of spectrally resolved portions of the $S_{in}(t)$ signal spectrum. The optical signal 68 produced by the FPI 42 is coupled to a 1×N power splitter 68 which equally divides the optical signal $S_{in}(t)$ power into N optical signals $P_1(t)$, $P_2(t)$, $P_3(t)$, $P_N(t)$. These signals $P_1(t)$, $P_2(t)$, $P_3(t)$, $P_N(t)$ are each coupled to an interference filters 46, 48, 50, 52 forming an array N (only 4 shown). Similarly to the filters 14, 16, 18, 20 shown in FIG. 2, the filters 46, 48, 50, 52 are also optical band pass filters designed to pass partially overlapping wavelength bands of the $S_{in}(t)$ spectrum. The filters 46, 48, 50, 52 each produces a band pass filtered signal $P_{1bp}(t)$, $P_{2bp}(t)$, $P_{3bp}(t)$, $P_{Nbp}(t)$ and are each connected to a respective photo-detector 54, 56, 58, 60 forming an array of N photo-detectors (only 4 shown). The photo-detectors 54, 56, 58, 60 are connected to an electronic switch 62 controlled by the control unit 66 to produce after amplification in an amplifier 64 an electrical signal 70 which is coupled to a processing unit 65. The processing unit 65 is coupled to receive a sampling signal 67 for sampling the electrical signal 70 and produce a high-resolution measurement of the entire $S_{in}(t)$ spectrum.

Similarly to the electrical signal 34 of FIG. 2, the electrical signal 70 has a spectrum which also contains separated spectrally resolved portions of the incoming signal $S_{in}(t)$ spectrum. However, the manner in which the spectrally resolved portions are separated is this particular embodiment is different.

Compared to the previous embodiment described above in relation to FIG. 2, the order in which the incoming signal $S_{in}(t)$ spectrum is processed in this particular embodiment is reversed. In this particular embodiment, the incoming signal $S_{in}(t)$ is first applied to the FPI 42 to isolate multiple series of spectrally resolved portions from the $S_{in}(t)$ spectrum and these series are then separated in the space domain with the filters 46, 48, 50, 52 so that the spectrally resolved portions isolated can be processed in sequence.

Similarly to the FPI 24 of FIG. 2, the FPI 42 is also designed with a sufficiently large FSR such that each partially overlapping filter bands defined only has one FPI frequency response peak located therein. Further, the FPI 42 is also incrementally tuned by the control unit (66 so that each FPI frequency response peak completely and continuously scans a particular band.

For each FPI tuning increment, the FPI 42 isolates a different series of spectrally resolved portions of the $S_{in}(t)$ spectrum where each portion is from a different band. In order to cover the entire $S_{in}(t)$ spectrum, the FPI frequency response is incrementally swept across the $S_{in}(t)$ spectrum to produce enough series of spectrally resolved portions of the $S_{in}(t)$ spectrum (such as shown in $H_1(\lambda)$, $H_2(\lambda)$ and $H_3(\lambda)$ of FIG. 1) to adequately cover each band and hence cover the entire $S_{in}(t)$ spectrum.

The spectrally resolved portions produced in each series are then separated by the filters 46, 48, 50, 52 and respectively carried by the signals $P_{1bp}(t)$, $P_{2bp}(t)$, $P_{3bp}(t)$, $P_{Nbp}(t)$. In this particular embodiment, the signals $P_{1bp}(t)$, $P_{2bp}(t)$, $p_{3bp}(t)$, $P_{Nbp}(t)$ are optoelectrically converted by the photo-detectors 54, 56, 58, 60 before being sequentially coupled through by the electrical switch 62 to form the electrical signal 70. By appropriately sampling the electrical signal 70 in the processing unit 65, the spectrally resolved portions of the $S_{in}(t)$ spectrum produced in each series can be further processed therein to produce a high-resolution measurement of the entire $S_{in}(t)$ spectrum.

Similarly to the embodiment of FIG. 2, the incremental tuning of the FPI 42 shown in this embodiment is also continuously repeated in scan cycles so that the entire $S_{in}(t)$ spectrum can be continuously monitored. During each scan cycle, the switch 62 sequentially produces in the electrical signal 70 the spectrally resolved portions of the $S_{in}(t)$ spectrum separated in the filters 46, 48, 50, 52. The switch 62 is also cyclically operated in synchronization with the scan cycles to form the electrical signal 70 which is then sampled in the processing unit 65 to obtain a high-resolution measurement of the $S_{in}(t)$ signal (further details below).

Figure 5:
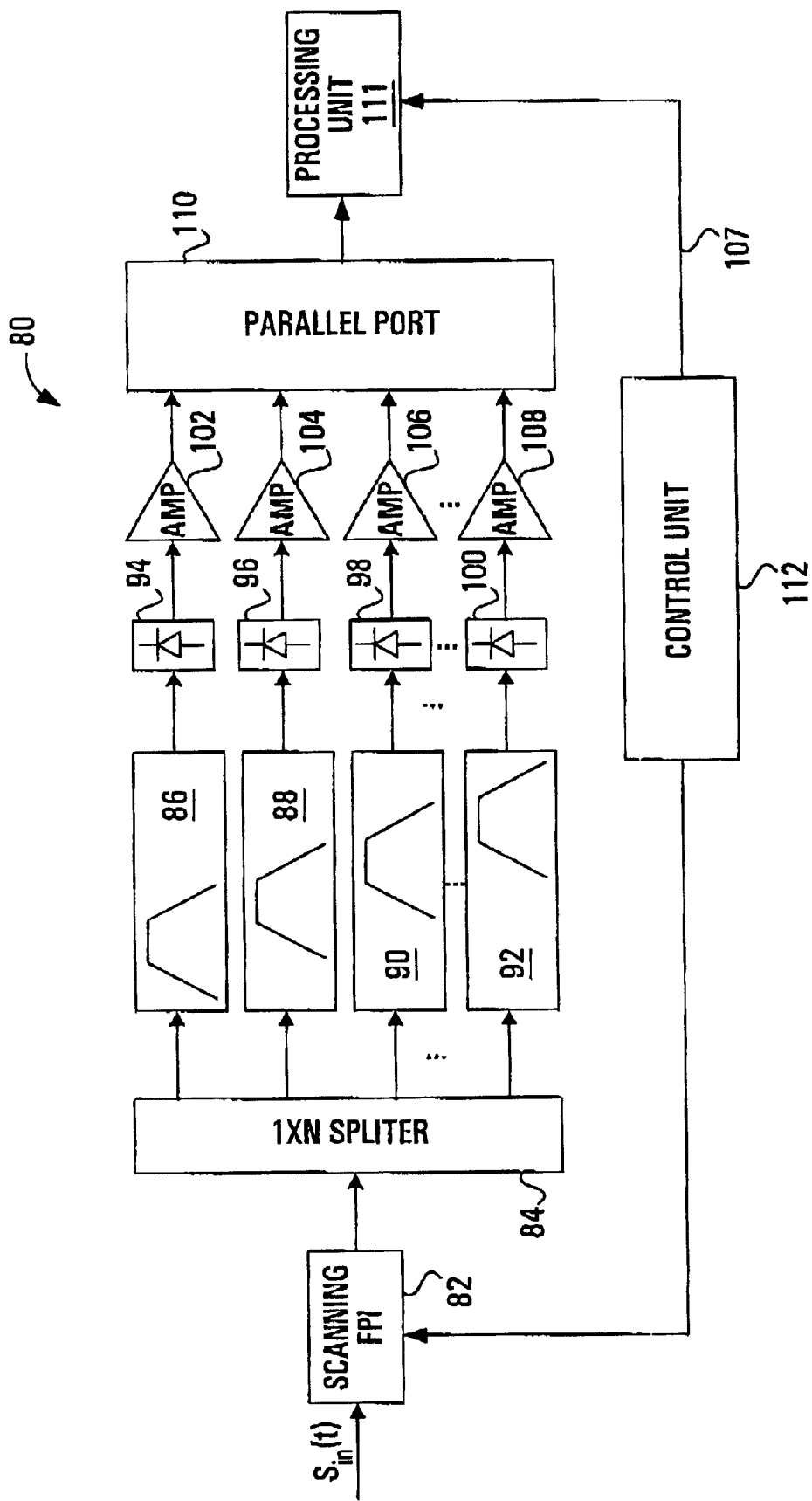
FIG. 5 shows an optical spectrum analyzer according to yet another preferred embodiment of the invention featuring a FPI and a parallel port.

Referring now to FIG. 5, there is illustrated another preferred embodiment of the invention incorporated in an optical spectrum analyzer 80 where the incoming optical signal $S_{in}(t)$ is also applied first to a FPI 82 and where the different series of spectrally resolved portions of the $S_{in}(t)$ spectrum produced by the FPI 82 are processed in parallel.

Similarly to the spectrum analyzer 40 of FIG. 4, this particular optical spectrum analyzer 80 also has the FPI 82, a 1×N power splitter 84, N interference filters 86, 88, 90, 92 (only 4 shown), N photo-detectors 94, 96, 100 (only 4 shown), a control unit 112 and a processing unit 111 interconnected in the same manner the FPI 42, the 1×N power splitter 44, the interference filters 46, 48, 50, 52, the photo-detectors 54, 56, 58, 60, the control unit 66 and the processing unit 65 of the optical spectrum analyzer 40 are interconnected.

For parallel processing of each series of spectrally resolved portions produced by the FPI 42, the electrical switch 62 and connecting amplifier 64 shown in FIG. 4 are replaced with an array of N amplifiers 102, 104, 106, 108 (only 4 shown) connected to a parallel port 110. In the processing unit 111, the spectrally resolved portions of the $S_{in}(t)$ spectrum of each series are digitized by operation of a sampling signal 107 provided by the control unit 112 so that the $S_{in}(t)$ spectrum can be constructed. The sampling signal 107 is further described below in reference to FIGS. 6, 7A, 7B, 7C, 8, 9A and 9B.

The preferred embodiments described above in relation to FIGS. 2, 3, 4 and 5 are illustrative of various methods which can be used to space-domain separate spectrally resolved portions of an incoming optical signal spectrum produced by an interferometer. As noted above, the spectrally resolved portions can also be separated in the time domain.

According to the invention, this can be accomplished by time-delaying the $S_{in}(t)$ spectrum in bands as a function of wavelength and sequentially passing the time-delayed bands into an interferometer to produce a series of spectrally resolved portions of the $S_{in}(t)$ spectrum.

Figure 6:
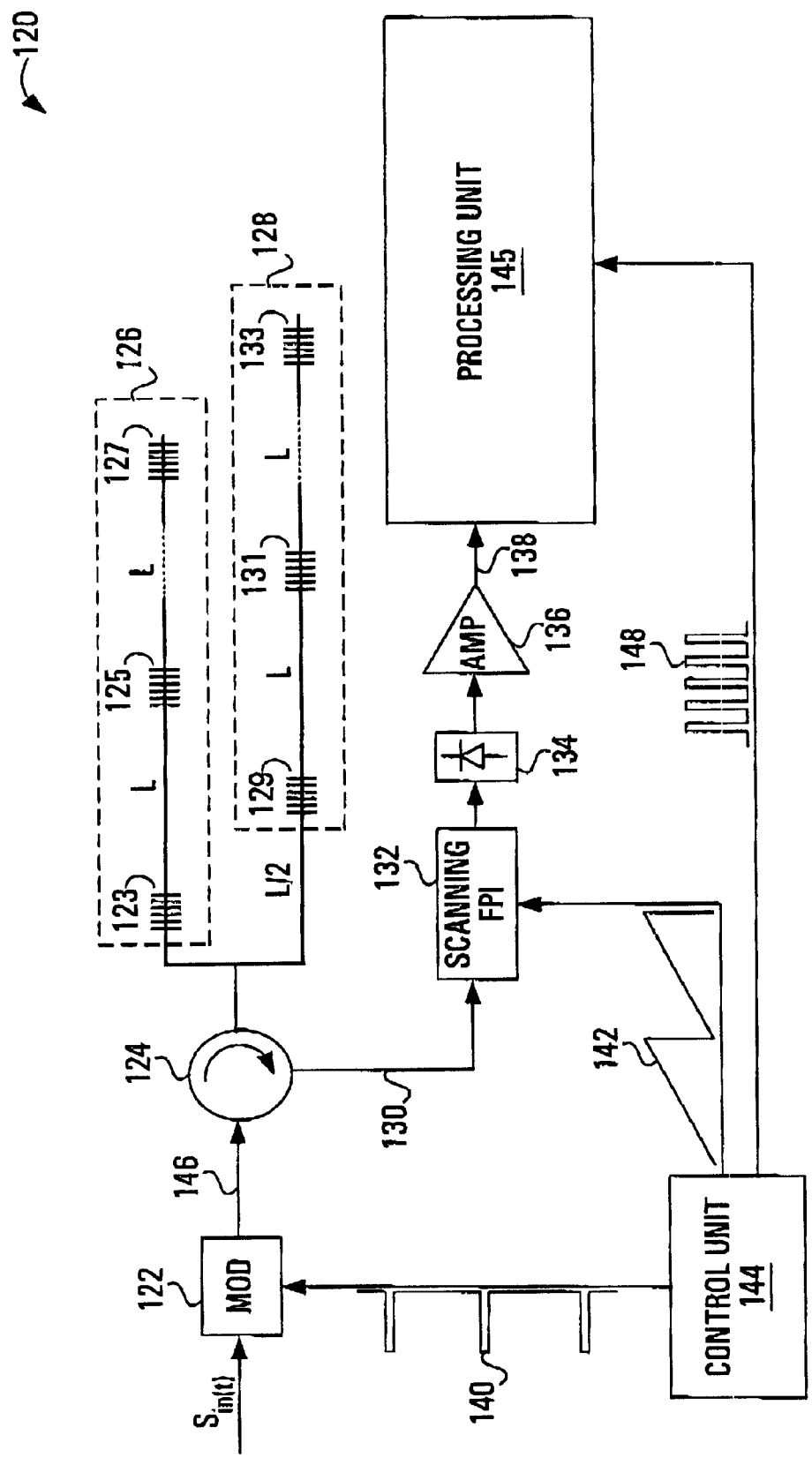
FIG. 6 shows an optical spectrum analyzer according to yet another preferred embodiment of the invention featuring a FPI and a pair of fiber Bragg Grating (FBG) branches.

There are many ways by which regions of the incoming $S_{in}(t)$ spectrum can be time-delayed as a function of wavelength. Referring now to FIG. 6, there is illustrated another preferred embodiment of the invention where bands of the $S_{in}(t)$ spectrum are time-delayed with fiber gratings. In this embodiment, the invention is also implemented as an optical spectrum analyzer generally indicated by 120 which can be used for monitoring the spectrum of the incoming optical signal $S_{in}(t)$ In order to time-delay regions of the $S_{in}(t)$ spectrum, the optical spectrum analyzer 120 has a modulator 122 coupled through a directional coupler 124 to a pair of fiber Bragg gratings (FBG) branches generally indicated by 126 and 128. The FBG branch 126 is formed of N cascaded FBGs 123, 125, 127 (only three shown) and the branch 128 is formed of N cascaded FBGs 129, 131, 133 (only three shown). On each branch 126, 128, a fiber length L separates adjacent FBGs. The branches 126, 128 are connected to the directional coupler 124 with a fiber length differential of L/2 to distance interleave from the directional coupler 124 the FBGs 123, 125, 127 of branch 126 with the FBGs 129, 131, 133 of branch 128. Each FBG 123, 125, 127, 129, 131, 133 is tuned to a different wavelength region or band of the incoming signal spectrum to reflect any incident light therein back to the directional coupler 124.

The directional coupler 124 is also connected to produce an optical signal 130 to an FPI 132. The FPI 132 is connected to a photo-detector 134 which, in turn, is coupled to an amplifier 136 to produce an electrical signal 138. The electrical signal 138 is coupled to a processing unit 145 for monitoring the $S_{in}(t)$ spectrum.

In the optical spectrum analyzer 120, clock synchronization is provided by a control unit 144. More specifically, the control unit 144 generates a sampling signal 148 for the processing unit 145 to sample the electrical signal 138 (further details below) and a clock signal 140, 142 to each of the modulator 122 and the FPI 132.

In operation, the signal $S_{in}(t)$ is modulated in the modulator 122 with the clock signal 140 (hereinafter referred to as the "modulation signal") generated in the control unit 144. The modulator 122 produces an output signal 146 which can be viewed as a stream of light pulses each containing a sample of the incoming signal $S_{in}(t)$. This output signal 146 is then coupled into the FBG branches 126, 128 by the directional coupler 124 where the light present in each pulse is reflected to the FPI 132 as a function of wavelength. It will be recalled that each FBG 123, 125, 127, 129, 131, 133 is tuned to reflect light propagating in a particular spectral range. As the FBGs 123, 125, 127, 129, 131, 133 on each branch 126, 128 are cascaded, light propagating in different spectral ranges is reflected to the FPI 132 at different times. The signal pulses coupled into the FBGs 123, 125, 127, 129, 131, 133 are therefore time-delayed as a function of wavelength. This has the effect of time-domain separating the $S_{in}(t)$ spectrum into wavelength regions where each region being reflected by a particular FBG 123, 125, 127, 129, 131, 133 at a different time.

For each signal pulse coupled into the FBGs 123, 125, 127, 129, 131, 133, the FPI 132 receives bands of the $S_{in}(t)$ spectrum through the directional coupler 124 in sequence as each band is reflected at a different time by a particular FBG 123, 125, 127, 129, 131, 133. More specifically, for each signal pulse fed into the FBGs 123, 125, 127, 129, 131, 133, the FPI 132 will receive light reflected by the FBG 123 first, followed by light reflected by the FBG 125, then light reflected by the FBG 127, light reflected by the FBG 129, light reflected by the FBG 131 and light reflected by the FBG 133.

As a result of this wavelength-dependent time delay, only one band of the $S_{in}(t)$ spectrum is reflected at a time and only one spectrally resolved portion of the $S_{in}(t)$ spectrum will be produced at a time by the FPI 132. Similarly to the other embodiments hitherto described, the FPI 132 is designed with sufficiently large FSR such that each band only has one peak located therein. As the FPI 132 only receives one band at a time, the FPI 132 will only isolate a single spectrally resolved portion of the $S_{in}(t)$ spectrum corresponding to particular narrow-band wavelength range within each band.

To further illustrate this, reference is now made to FIG. 7A, 7B and 7C where there is shown referenced to the $S_{in}(t)$ spectrum a wavelength plot $F_1(\lambda)$ of the FBG branch 126 transfer function (FIG. 7A), a wavelength plot $F_2(\lambda)$ of the FBG branch 128 transfer function (FIG. 7B) and three wavelength plots of the FPI transfer function respectively denoted by $H_4(\lambda)$, $H_5(\lambda)$ and $H_6(\lambda)$. The FBG branch 126 transfer function (see $F_1(\lambda)$ consists of N FBG reflection bands $B_1$, $B_2$ and $B_N$ (only 3 shown) where each band is associated with a particular FBG 123, 125, 127. Similarly, the FBG branch 128 transfer function (see $F_2(\lambda)$ consists of N FBG reflection bands $b_1$, $b_2$ and $b_N$ (only 3 shown) where each band is associated with a particular FBG 129, 131, 133. Combined, the FBG transfer functions $F_1(\lambda)$ and $F_2(\lambda)$ cover the entire $S_{in}(t)$ spectrum so that light propagating at any wavelength of the $S_{in}(t)$ spectrum can be fully reflected back to the FPI 132 for continuous monitoring.

For each particular signal pulse produced by the modulator 122, the FBGs 123, 125, 127, 129, 131, 133 each operates to reflect a respective band $B_1$, $B_2$, $B_N$, $b_1$, $b_2$, $b_N$ of the $S_{in}(t)$ spectrum at a different time. The FPI 132 receives the bands reflected in sequence and produce therefrom a series of spectrally resolved portions of the $S_{in}(t)$ spectrum. The plots $H_4(\lambda)$, $H_5(\lambda)$ and $H_6(\lambda)$ are each representative of how the FPI transfer function is used for a particular signal pulse to produce a different series of spectrally resolved portions of the optical signal spectrum.

Figure 7:
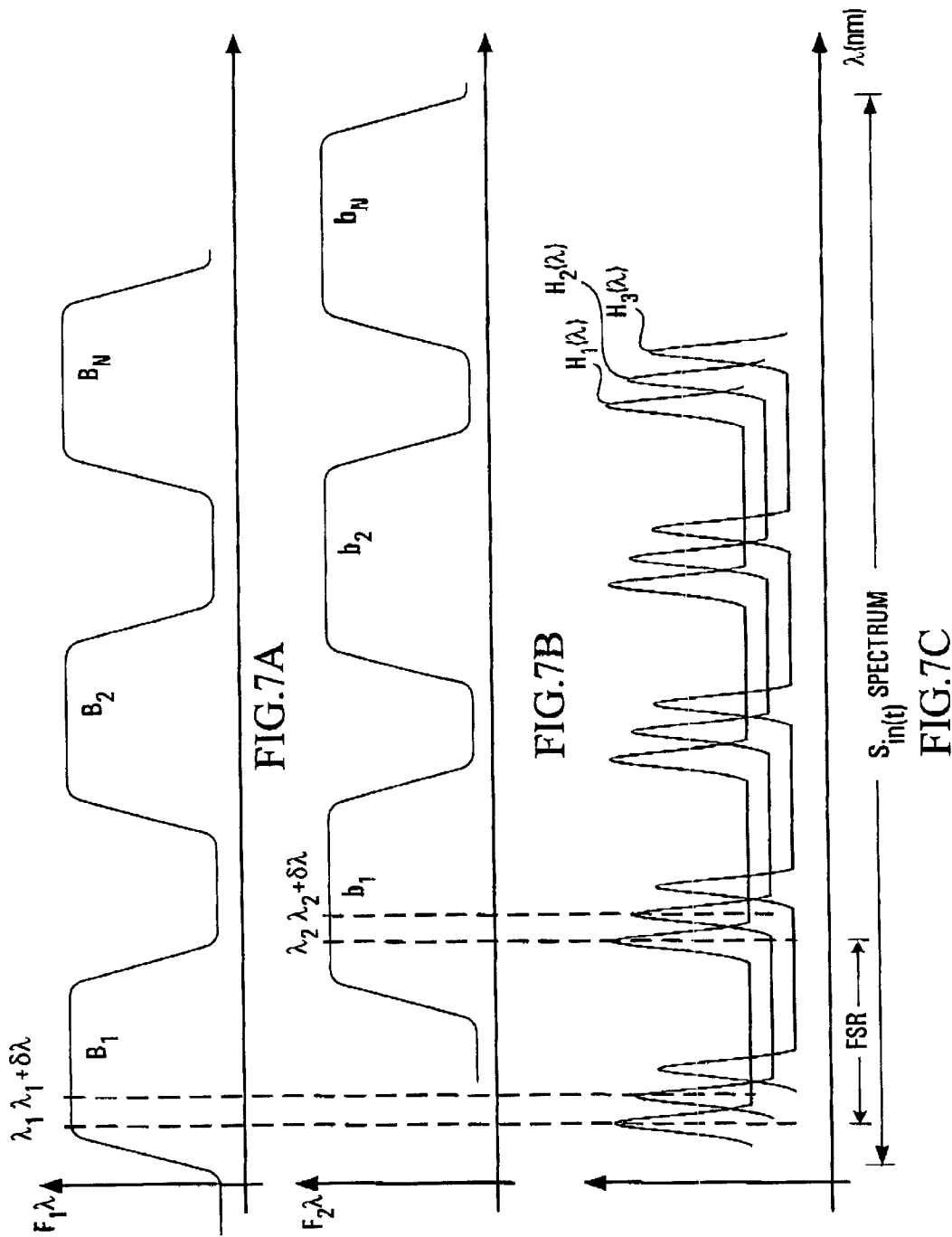
FIG. 7A shows a wavelength plot $F_1(\lambda)$ of the transfer function for a first FBG branch shown in FIG. 6.
FIG. 7B shows a wavelength plot $F_2(\lambda)$ of the transfer function for a second FBG branch shown in FIG. 6.
FIG. 7C shows multiple wavelength plots of the FPI transfer function denoted by $H_4(\lambda)$, $H_5(\lambda)$ and $H_6(\lambda)$.

For example, it can be observed from $H_4(\lambda)$ of FIG. 7 that as the band $B_1$ is reflected, a spectrally resolved portion of the $S_{in}(t)$ spectrum centered at $\lambda 1$ is isolated by the FPI 132. When the band $b_1$ is reflected some time later, another spectrally resolved portion of the $S_{in}(t)$ spectrum centered at $\lambda 2$ is isolated. This process is repeated until all bands $B_1$, $b_1$, $B_2$, $b_2$, $B_N$ and $b_N$ have been reflected for this signal pulse and the FPI 132 has isolated therefrom a spectrally resolved portion of the $S_{in}(t)$ spectrum.

The FPI 132 is then incrementally tuned by the control unit 144 with the clock signal 142 (hereinafter the "FPI clock signal") to move the FPI transfer function slightly across the $S_{in}(t)$ spectrum by $\delta\lambda$ for the next signal pulse (see $H_2(\lambda)$. For this next pulse, as the band $B_1$ is reflected, a spectrally resolved portion of the $S_{in}(t)$ spectrum centered at $\lambda1+\delta\lambda$ is isolated by the FPI 132. When the band $b_1$ is reflected some time later, another spectrally resolved portion of the $S_{in}(t)$ spectrum this time centered at $\lambda2+\delta\lambda$ is isolated. Again, this process is repeated until all bands $B_1, b_1, B_2, b_2, B_N$ and $b_N$ have been reflected and the FPI 132 has isolated therefrom a spectrally resolved portion of the $S_{in}(t)$ spectrum.

By operating the FPI 132 to isolate different series (such as shown in $H_4(\lambda)$, $H_5(\lambda)$ and $H_6(\lambda)$ of spectrally resolved portions of the optical signal spectrum, a high-resolution measurement of the entire signal spectrum can be obtained. Similarly to the embodiments described above, the FPI 132 is tuned by the control unit 144 so that each FPI frequency response peak can sweep across an entire band $B_1, b_1, B_2, b_2, B_3, b_3$. Similarly to the other embodiments described above, the incremental tuning of the FPI 132 shown in this embodiment is also continuously repeated in cycles so that each band is continuously scanned and therefore the entire $S_{in}(t)$ spectrum continuously monitored. The tuning of the FPI 132 will now be further described in detail together with the modulation signal 140 and sampling signal 148 generated by the control unit 144. It is understood that with the exception of the modulation signal 140, this description equally applies to the embodiments shown and described above in relation to FIGS. 2, 3, 4 and 5.

Referring back to FIG. 6, the tuning of the FPI 132 is performed with the clock signal 142 generated by the control unit 144. With this clock signal 142, the control unit 144 operates to incrementally move the FPI frequency response along the optical spectrum in cycles to provide continual monitoring of the entire $S_{in}(t)$ spectrum.

During each clock signal cycle, the FPI frequency response is progressively shifted across the entire $S_{in}(t)$ spectrum so that the FPI 132 can isolate different series of spectrally resolved portions of the $S_{in}(t)$ spectrum. In order to progressively shift the FPI frequency response, the control unit 144 increases the FPI clock signal 142 amplitude (voltage or current) in fixed increments until the FPI frequency response has been moved across the entire $S_{in}(t)$ spectrum. Each clock signal increment places the FPI frequency response to a different wavelength location along the $S_{in}(t)$ spectrum. According to the invention, a new signal pulse is generated by the modulator 122 each time the clock signal amplitude is incremented so that for each clock signal increment, the FPI 122 can isolate a different series of spectrally resolved portions of the $S_{in}(t)$ spectrum. By sampling the resulting output signal 138 in the processing unit 145, the spectrally resolved portions of the $S_{in}(t)$ spectrum isolated can be digitized and collected therein to produce a high-resolution measurement of the entire $S_{in}(t)$ spectrum.

Figure 8:
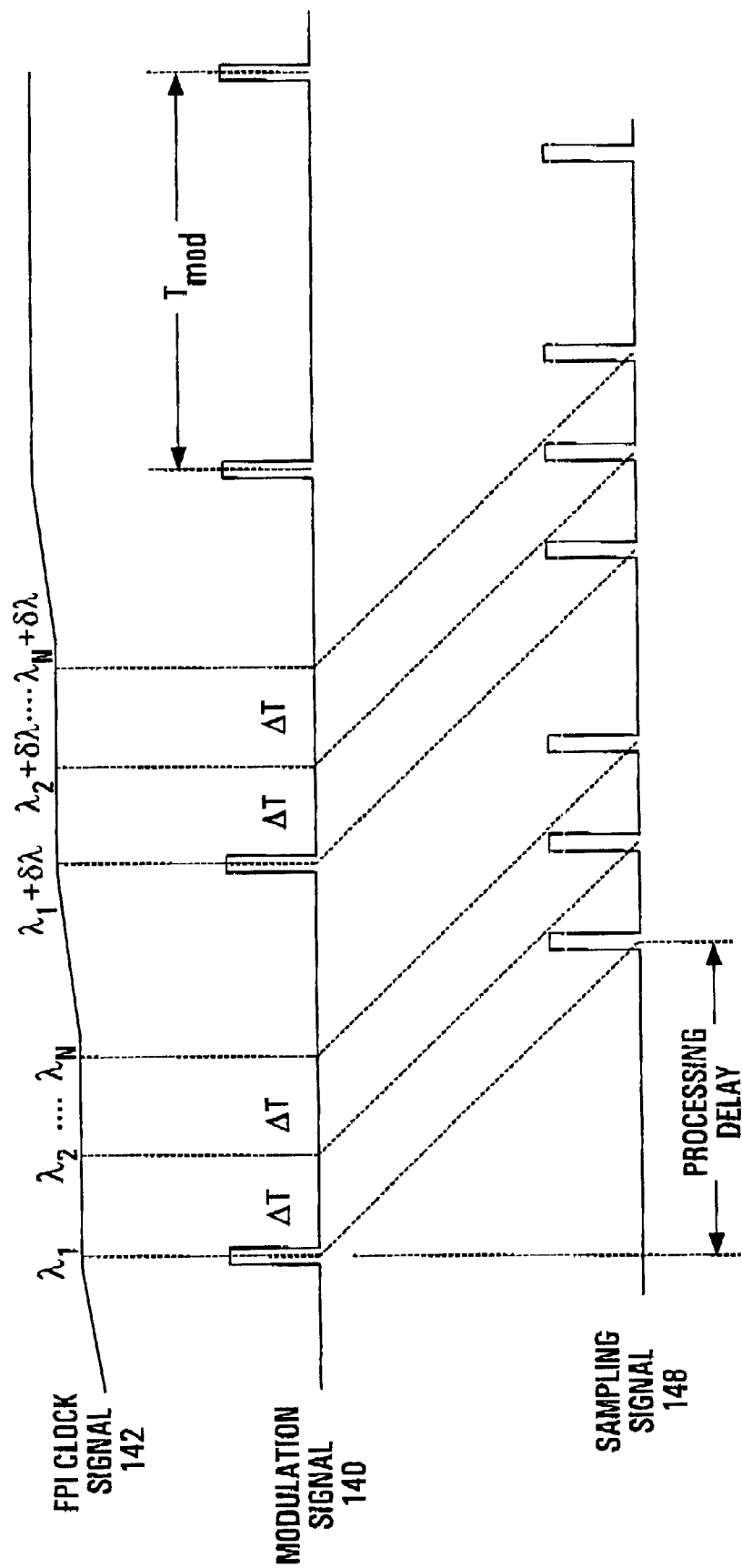
FIG. 8 shows three timing diagrams of a modulating signal, a FPI clock signal and a sampling signal produced by a control unit of the optical spectrum analyzer cf FIG. 6.

To further illustrate this, reference is now made to FIG. 8 where there is shown a timing diagram of a cycle portion of the FPI clock signal 142 together with the modulation signal 140 and the optical spectrum analyzer sampling signal 148 referenced thereto. From this figure, it can be observed that during each clock signal increment, a new signal pulse is generated by the modulator 122 and a different series of spectrally resolved portions of the $S_{in}(t)$ spectrum is isolated by the FPI 132. It can also be observed that during each clock signal increment, samples of each spectrally resolved portion isolated are taken at $\Delta T$ intervals following an initial processing delay to construct in the processing unit 145 (see FIG. 145) a high resolution of the entire $S_{in}(t)$ spectrum.

The speed at which the optical signal $S_{in}(t)$ spectrum can be cyclically swept is a function of the speed at which the optical signal $S_{in}(t)$ can be modulated. For fast monitoring of the $S_{in}(t)$ spectrum, the signal $S_{in}(t)$ must be modulated by the modulator 122 at a high modulation frequency $1/T_{mod}$ to define a small modulation (steeping) period $T_{mod}$. It will be appreciated that the modulation period $T_{mod}$ cannot be any less than the time necessary $T_{sweep}$ for the optical spectrum analyzer 120 to sweep across the entire optical signal $S_{in}(t)$ spectrum (also referred to as the "sweeping speed"):

$$T_{mod} \geq T_{sweep}$$

In order to select the smallest modulation period $T_{mod}$ possible, the sweeping time $T_{sweep}$ of the optical spectrum analyzer 120 shown in FIG. 6 must first be determined. The following section will now describe an example of how $T_{sweep}$ can be determined to calculate the smallest modulation period $T_{mod}$ possible.

An important constraint affecting $T_{sweep}$ is the scanning speed of the FPI 132 (time to scan an entire FSR period). The scanning speed of an FPI is a measure of the time required to move the FPI transfer function across the optical spectrum to scan an entire FSR period. Generally, the scanning speed of a typical FPI scanning speed using a piezo-electrica translator (PZT) can be in the order of one millisecond (ms). The FPI scanning speed can also be expressed on a per-step basis. For example, if 200 steps are used to scan an FSR period, it can be assumed for any commercially available FPI exhibiting a scanning speed in the order of 1 ms that the FPI scanning time per step also referred to as the "settling time per step" will not exceed 20 $\mu$sec;

$$\text{FPI settling time/step}=20 \ \mu\text{sec} >> (1 \text{ ms}/200=5 \ \mu\text{sec})$$

In addition to being dependent upon the scanning speed of the FPI 132, the sweeping time $T_{sweep}$ of the optical spectrum analyzer 120 is also a function of the processing time necessary for the FPI 132 to process each signal pulse. It will be recalled that before reaching the FPI 132, each pulse is time-delayed by the FBGs 123, 125, 127, 129, 131, 133 as a function of wavelength. The time necessary to process a particular pulse (hereinafter referred to as the "data acquisition time") can be defined as the time necessary for all the pulse spectrum bands to propagate through the FBG branches 126, 128 and reach the FPI 132. The data acquisition time can be expressed as follows:

$$\text{Data acquisition time}=2*N*\Delta T$$

where N is the number of FBGs 123, 125, 127, 129, 131, 131 present in each branch 126, 128 defining the number of reflected bands therein and $\Delta T$ is the time elapsed at the FPI 132 between the receipt of any two sequentially reflected bands of the $S_{in}(t)$ spectrum.

At the FPI 132, any two sequentially received bands of the $S_{in}(t)$ spectrum are reflected by a FBG 123, 125, 127 of branch 126 and an FBG 129, 131, 131 of branch 128 which are distance interleaved relative to directional coupler 124 by a fiber length of L/2. The time $\Delta T$ elapsed at the FPI 132 between the receipt of any two sequentially reflected bands of the incoming signal spectrum is a function of the distance separating the reflecting FBGs 123, 125, 127, 129, 131, 133 relative to the directional coupler 124 and can be expressed as:

$$\Delta T=2*n*\Delta L/c;$$

where n is the refractive index of the fiber used, $\Delta L$ is the distance separating the reflecting FBGs 123, 125, 127, 129, 131, 133 (L/2) and c is the speed of light in vacuum. Considering the above expressions, the data acquisition time can be reformulated as;

Data acquisition time=$(2*N*2*n*L)/(2*c)=2*N*n*L/c$;

Without loss of generality, the data acquisition time and the FPI settling time/step summed can be said to define the minimum amount of time necessary for the optical spectrum analyzer 120 to sweep across the entire optical signal $S_{in}(t)$ spectrum. In other words, they define $T_{sweep}$:

$T_{sweep}$=data acquisition time +FPI settling time/step

Considering over expressions for the data acquisition time and the FPI settling time/step, $T_{sweep}$ for a 200 step scan FPI exhibiting a scanning speed in the order of 1 ms is given by:

$T_{sweep}=2*N*n*L/c+20$ μsec

As an example, assuming the refractive index of the fiber used is 1.5, if 10 FBGs (N=10) are used in the FBG branches 126, 128, and the length L separating adjacent FBGs in a same branch 126, 128 is 1.5 meters (m), $T_{sweep}$ would be:

$T_{sweep}=(2*10*1.5*1.5$ m$)/3*108$ m/s$+20$μsec;

=300 n sec+20 μsec;

=20.3 μsec

As the modulation period $T_{mod}$ cannot be any less than $T_{sweep}$ ($T_{mod} \geq T_{sweep}$), $T_{sweep}$ defines a lower limit for the modulation period $T_{mod}$ and the minimum value possible for $T_{mod}$ would be 20.3 μsec.

Figure 9:
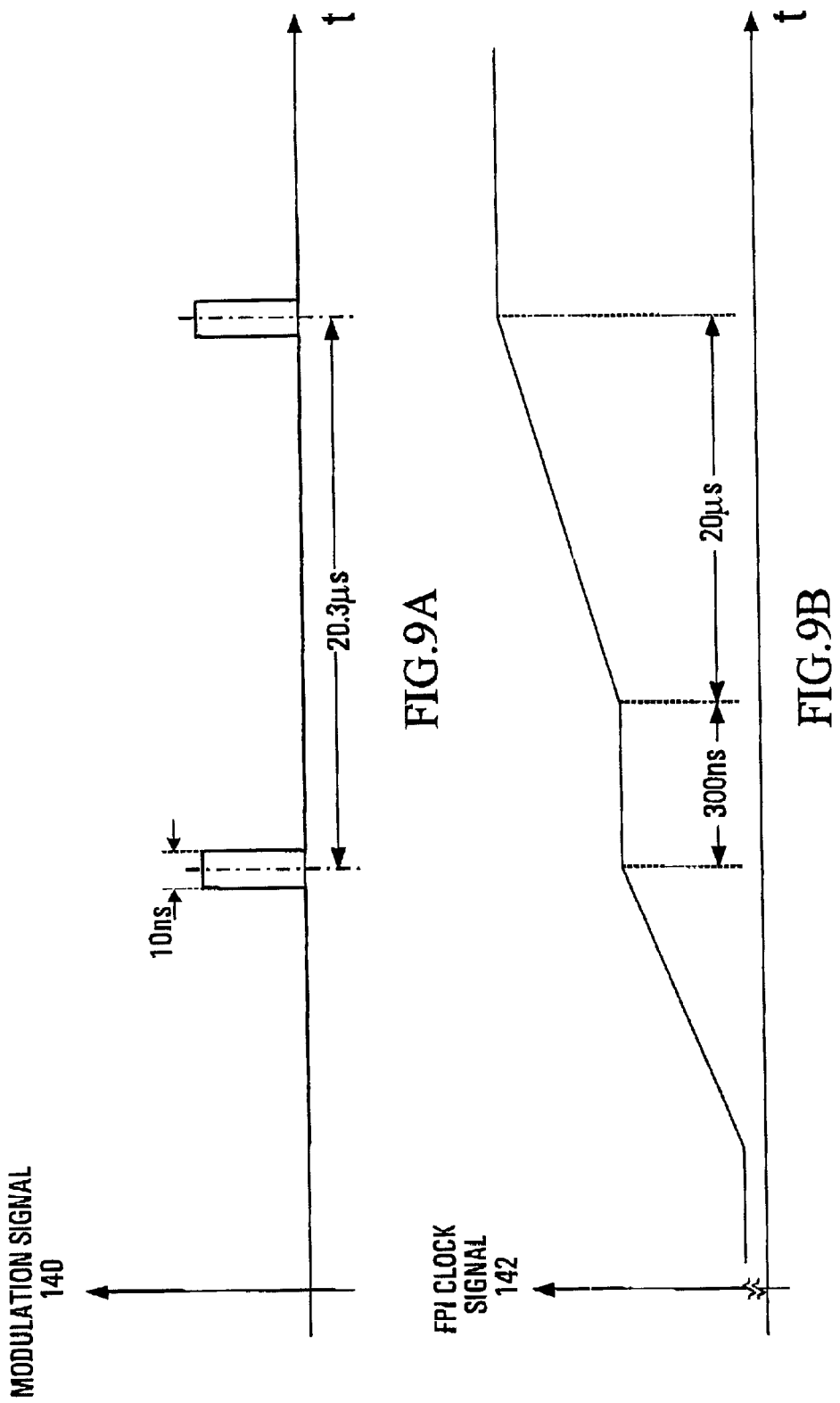
FIG. 9A shows a magnified timing diagram of the modulation signal shown in FIG. 8.
FIG. 9B shows a magnified timing diagram of the FPI clock signal shown in FIG. 8.

To further illustrate this, FIG. 9A shows a time plot of the modulation signal 140 with $T_{mod}$=20.3 μsec and FIG. 9B shows a corresponding portion of the FPI clock signal 142 with a period $T_{sweep}$ formed of a 300 nsec data acquisition time and a 20 μsec FPI settling time per step.

Figure 10:
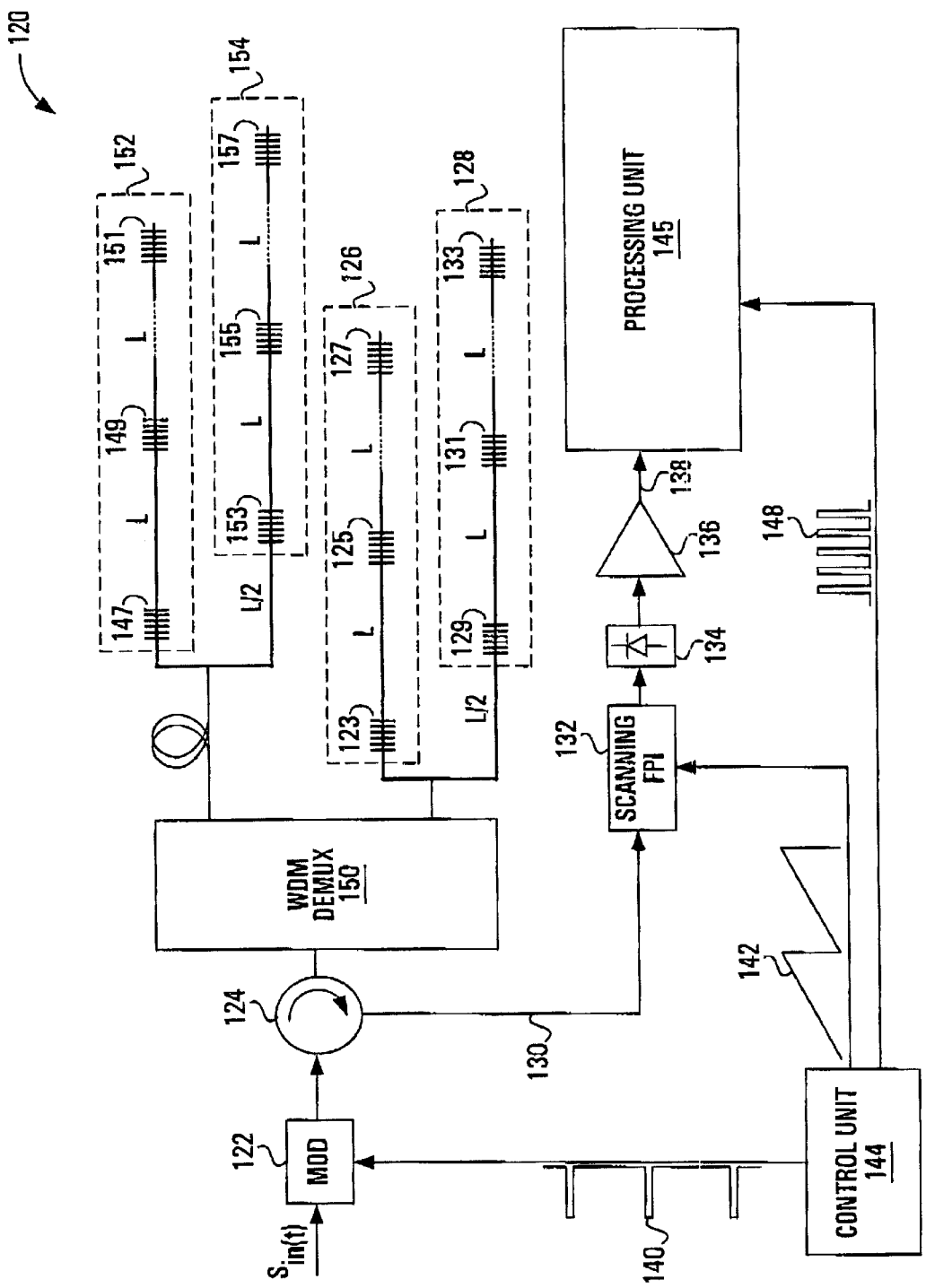
FIG. 10 shows the optical spectrum analyzer of FIG. 6 according to yet another preferred embodiment. of the invention featuring an additional pair of FBG branches.

According to the invention, the spectrum range provided by the optical spectrum analyzer can be expended either by cascading more FBGs in each FBG branch 126, 128 or by increasing the reflection band of each FBG and the FSR period of the FPI 132. Another way to extend the measurable spectrum range is to use a WDM coupler to increase the number of FBG branches that can be used. FIG. 10 shows an example where a 3-port WDM coupler 150 is used to add another pair of FBG branches 152, 154 and therefore double the measurable spectrum range.

In this particular example, the WDM coupler 150 interconnects each FBG branch 126, 128, 152, 154 to the directional coupler 124. The new FBG branches 152, 154 are identical to the existing FBG branches 126 and 128 and, as such, are each formed of N cascaded FBGs 147, 149, 151 and 153, 155, 157 respectively (only three shown in each branch 156, 158). Similarly to the FBGs 123, 125, 127 and 129, 131, 133 of the existing branches 126, 128, the FBGs 147, 149, 151 and 153, 155, 157 of the new branches 156, 158 are distance interleaved relative to the directional coupler 124 with a fiber length differential of L/2. The new branches 156, 158 are connected to the directional coupler 124 by a fiber of length (N*L+L/2) to prevent light reflected therein from interfering with light reflected in the existing branches 126, 128. With this additional fiber length, the FPI 132 will receive bands reflected by the existing branches 126, 128 first before receiving any band reflected by the new branches 156, 158.

Figure 11:
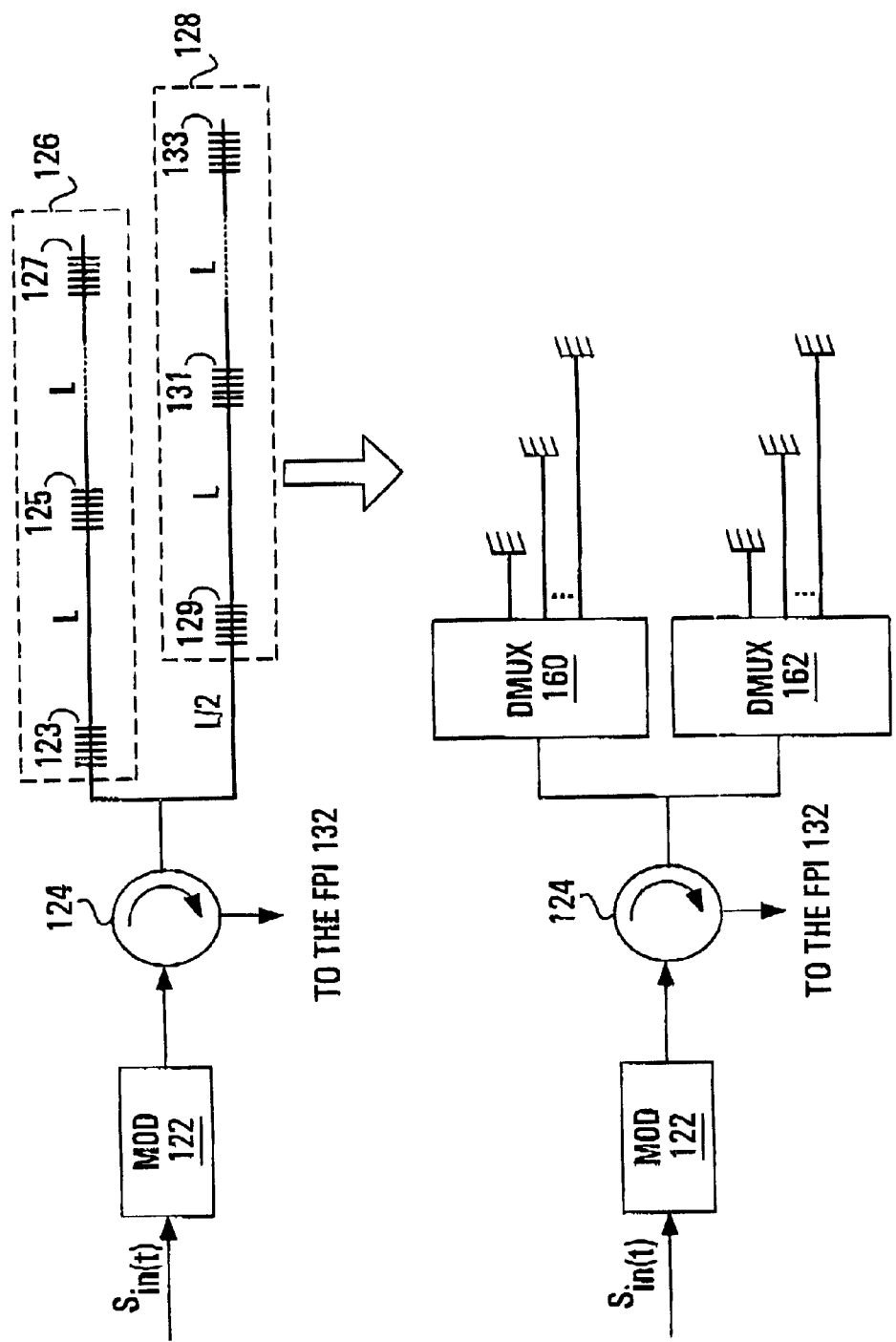
FIG. 11 shows the optical spectrum analyzer of FIG. 6 where each FBG branch is replaced by a wavelength division multiplexed (WDW) demultiplexer.

Instead of using optical fiber gratings, an alternative way to make wavelength-dependent delay lines is to use WDM demultiplexers. FIG. 11 shows an example where each FBG branch 126, 128 of the embodiment of FIG. 6 has been replaced by a WDM demultiplexer 160, 162 connected to separate the $S_{in}(t)$ spectrum into N bands and coupling each band separated into one of a plurality N of optically terminated fiber lines (only 3 shown). In this particular example, the fiber lines are each of a different length to implement a different delay for each band. As a result of the different lengths, the bands are reflected to the FPI 132 at a different time therefore achieving a time domain separation of the optical signal spectrum. An advantage of this particular configuration is that the different bands are time delayed in parallel without any cascading loss incurred as would otherwise be the case with the use of cascaded FBGs.

Figure 12:
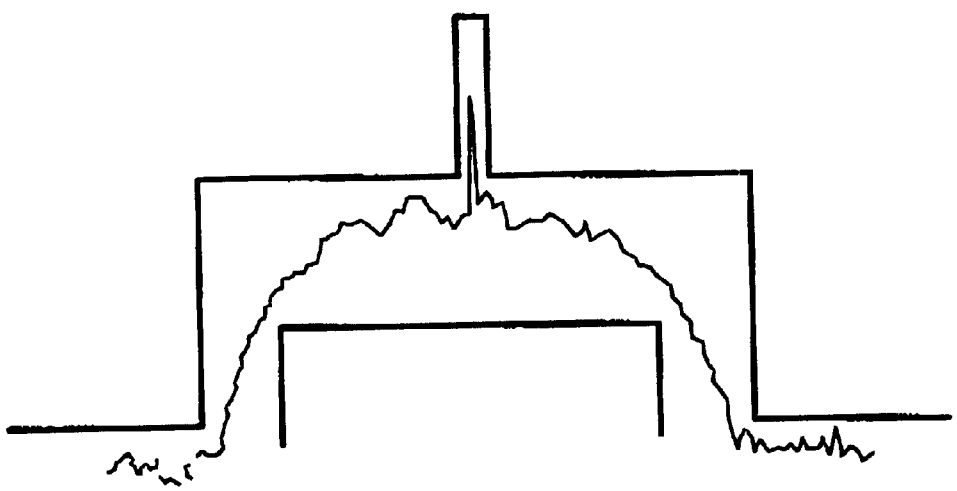
FIG. 12 shows a spectrum mask which can be used according to the invention to facilitate the monitoring of various signal transmission parameters.

The invention described above by way of preferred embodiments can be used to effectively resolve the optical signal spectrum with a high resolution. Referring now to FIG. 12, a spectrum mask can be used to facilitate the monitoring of various signal transmission parameters such as carrier wavelengths, optical SNRs, ASE noise levels, optical non-linearities or other signal baseband information such as data rates and formats.

Although embodiments of the invention have been described above, it is not limited thereto and it will be apparent to those skilled in the art that numerous modifications form part of the present invention insofar as they do not depart from the spirit, nature and scope of the claimed and described invention.

The preferred embodiments of the present invention have each been described above in relation to a particular optical spectrum analyzer implementation. It is to be understood that for monitoring optical signals, the invention is not limited to optical spectrum implementations and can also be incorporated directly into any optical terminal. This could be useful for example for link quality monitoring (LQM) in optical communications networks.

The invention has been described above in relation to a FPI interferometer operable to scan different wavelength regions of an optical signal spectrum. It is to be understood that other interferometers could be used provided they exhibit a cyclical transfer function of narrow-band peaks each tunable to a particular narrow-band wavelength range and are operable to isolate different spectrally resolved portions of the signal spectrum in accordance with the principles described therein.

Further, the preferred embodiments described above in relation to FIGS. 2, 3, 4, have been described with respect to separate optical band pass filters to separate the optical signal spectrum. It is to be understood that other types of optical filtering devices such as WDM demultiplexers could also be used to achieve the same function provided the filtering bands used for separating the signal spectrum fully cover the entire spectrum. If WDM demultiplexers are used to separate the signal spectrum, at least two WDM demultiplexers with complimentary pass bands would have to be used in order to ensure that the WDM filtering bands combined fully cover the entire spectrum.

The control unit responsible for controlling the FPI scanning, the timing of data acquisition in the processing unit and in some embodiments, the modulation of the incoming optical signal in a modulator and the processing unit responsible for data acquisition, recording, processing and spectrum monitoring have been described above as separate units. It is understood that other implementations are possible. For example, the control unit and processing unit could alternatively be implemented together as a single controlling and processing unit. In the further alternative, the control and processing units could also be implemented as a series of smaller units, each responsible for a particular control or processing function and still fall within the purview of the invention.

We claim:

1. An apparatus for monitoring an optical signal of a spectrum, the apparatus comprising:
   an optical splitter connected to receive the optical signal in a series input and operable to couple the optical signal received to a plurality of parallel outputs;
   a plurality of optical filters each designed to a respective wavelength region, the plurality of optical filters being respectively connected to the plurality of power splitter outputs for separating the optical signal spectrum into a plurality of spectral bands and produce a corresponding plurality of intermediate optical signals each representative of a particular spectral band of the optical signal spectrum;
   a switch coupled to the plurality of optical filters via a plurality of parallel inputs and operable to sequentially produce in a series output each one of the plurality of intermediate optical signals in cycles;
   an interferometer connected to the series output of the switch to receive the plurality of intermediate optical signals for cyclically scanning the plurality of spectral bands wherein during each scan cycle, the interferometer is operable to sequentially isolate from each spectral band a spectrally resolved portion of the optical signal spectrum for producing an output optical signal sequentially representative of each isolated spectrally resolved portion of the optical signal spectrum;
   a photo-detector connected to the interferometer and operable to convert the output optical signal to an electrical signal sequentially representative of each isolated spectrally resolved portion of the optical signal spectrum; and
   a processing unit operable to sample the electrical signal for collecting one or more samples of each isolated spectrally resolved portion of the optical signal spectrum isolated for continuous monitoring of the optical signal spectrum.

2. The apparatus of claim 1 wherein the switch, the interferometer and the processing unit are each connected to a control unit.

3. The apparatus of claim 2 wherein the optical filters are designed to partially overlapping wavelength regions along the optical signal spectrum, each wavelength region corresponding to a respective spectral band.

4. The apparatus of claim 3 wherein the plurality of optical filters consists of two wavelength division multiplexed (WDM) demultiplexers designed with complementary pass bands for separating the optical signal spectrum into a plurality of spectral bands and produce a corresponding plurality of intermediate optical signals each representative of a particular spectral band of the optical signal spectrum.

5. The apparatus of claim 4 wherein the interferometer is a Febry-Perrot interferometer (FPI) with a periodic frequency response.

6. The apparatus of claim 5 incorporated in an optical spectrum analyzer for link quality monitoring (LQM) in an optical communication network.

7. An apparatus for monitoring an optical signal of a defined spectrum formed of a plurality of spectral bands, the apparatus comprising:
   an interferometer connected to receive the optical signal, the interferometer being operable to cyclically scan the optical signal spectrum. and isolate during each scan cycle multiple spectrally resolved portions of the optical signal spectrum each from a respective spectral band for producing an output optical signal;
   an optical splitter connected to receive the output optical signal in a series input and operable to couple the output optical signal received to a plurality of parallel outputs;
   a plurality of optical filters each designed to a particular wavelength region, the plurality of optical filters being respectively connected to the plurality of power splitter outputs for separating the spectrally resolved portions of the optical signal spectrum isolated during each cycle to produce a plurality of intermediate optical signals each representative during each cycle of a particular spectrally resolved portion of the optical signal spectrum separated;
   a plurality of photo-detectors connected to the plurality of optical filters and operable to convert the intermediate optical signals into a plurality of electrical signals; and
   a processing unit operable to sample the electrical signals for collecting one or more samples of each separated spectrally resolved portion of the optical signal spectrum separated during each cycle for continuous monitoring of the optical signal spectrum.

8. The apparatus of claim 7 wherein the optical filters are designed to partially overlapping wavelength regions along the optical signal spectrum, each wavelength region corresponding to a respective spectral band.

9. The apparatus of claim 8 wherein the plurality of optical filters consists of two WDM demultiplexers designed with complementary pass bands for separating the spectrally resolved portions of the optical signal spectrum isolated during each cycle to produce the plurality of intermediate optical signals.

10. The apparatus of claim 9 wherein the interferometer is a FPI with a periodic frequency response.

11. The apparatus of claim 10 further comprising a switch which has a plurality of parallel inputs respectively coupled to the plurality of photo-detectors and a series output coupled to the processing unit for sequentially producing thereto each one of the plurality of electrical signals in cycles.

12. The apparatus of claim 11 wherein the switch, the FPI and the processing unit are each connected to a control unit.

13. The apparatus of claim 10 further comprising a parallel port which has a plurality of parallel inputs respectively coupled to the plurality of photo-detectors and a parallel output coupled to the processing unit for producing thereto each one of the plurality of electrical signals in parallel.

14. The apparatus of claim 13 wherein the FPI and the processing unit are each connected to a control unit.

15. An apparatus for monitoring an optical signal of a defined spectrum, the apparatus comprising:
   a modulator connected to receive the optical signal for producing a modulated optical signal;
   a plurality of wavelength-dependent delay lines connected in parallel to receive the modulated optical signal and operable to delay the modulated optical signal as a function of wavelength for time-separating the optical signal spectrum into a plurality of spectral bands to produce an intermediate optical signal sequentially representative of the plurality of spectral bands;
   an interferometer coupled to receive the intermediate optical signal and operable to sequentially isolate from each spectral band a respective spectrally resolved portion of the optical signal spectrum for producing an output optical signal sequentially representative of each isolated spectrally resolved portion of the optical signal spectrum;

a directional coupler connecting the modulator to the plurality of wavelength-dependent delay lines and the plurality of wavelength-dependent delay lines to the interferometer;

a photo-detector operable to convert the output optical signal to an electrical signal sequentially representative of each isolated spectrally resolved portion of the optical signal spectrum; and a processing unit operable to sample the electrical signal for collecting one or more samples of each isolated spectrally resolved portion of the optical signal spectrum isolated to approximate the optical signal spectrum.

16. The apparatus of claim 15 incorporated in an optical spectrum analyzer for LQM in an optical communication network.

17. The apparatus of claim 15 wherein the plurality of wavelength-dependent delay lines consists of two wavelength-dependent delay lines for monitoring a particular signal spectrum range.

18. The apparatus of claim 17 wherein each wavelength-dependent delay line is a set of cascaded fiber gratings.

19. The apparatus of claim 18 wherein each cascaded fiber grating is a fiber Bragg grating (FBG).

20. The apparatus of claim 15 wherein each wavelength-dependent delay line is formed of a WDM demulitiplexer connected to a respective plurality of optically terminated fiber lines of different lengths.

21. The apparatus of claim 15 wherein the plurality of wavelength-dependent delay lines consists of four wavelength-dependent delay lines for monitoring an increased signal spectrum range.

22. The apparatus of claim 21 wherein each wavelength-dependent delay line is a set of cascaded fiber gratings.

23. The apparatus of claim 22 wherein each cascaded fiber grating is a FBG.

24. The apparatus of claim 21 wherein each wavelength-dependent delay line is formed of a WDM demultiplexer connected to a respective plurality of optically terminated fiber lines of different lengths.

25. A method of monitoring an optical signal of a defined spectrum, the method comprising:

separating the optical signal spectrum into a plurality of spectral bands;

using interferometry to cyclically scan each spectral band and isolate during each scan cycle multiple spectrally resolved portions of the optical signal spectrum for producing an output optical signal sequentially representative of each isolated spectrally resolved portion of the optical signal spectrum;

converting the output optical signal to an electrical signal sequentially representative of each isolated spectrally resolved portion of the optical signal spectrum; and sampling the electrical signal for collecting one or more samples of each isolated spectrally resolved portion of the optical signal spectrum isolated to approximate the optical signal spectrum.

26. The method of claim 25 wherein an interferometer with a frequency response formed of narrow-band peaks is used for cyclically scanning each spectral band and isolating during each scan cycle multiple spectrally resolved portions of the optical signal spectrum to produce an output optical signal sequentially representative of each isolated spectrally resolved portion of the optical signal spectrum.

27. The method of claim 26 wherein the interferometer is incrementally tuned in cycles so that each narrow-band peak of the interferometer frequency response cyclically scans a respective spectral band and isolate therefrom spectrally resolved portions of the optical signal spectrum.

28. The method of claim 27 wherein the optical signal spectrum is space-domain separated into the plurality of spectral bands with a plurality of optical filters.

29. The method of claim 28 wherein the plurality of optical filters are designed to partially overlapping wavelength regions along the optical signal spectrum, each wavelength region corresponding to a respective spectral band.

30. The method of claim 29 wherein the plurality of optical filters consists of two WDM demultiplexers designed with complementary pass bands.

31. The method of claim 27 wherein the optical signal spectrum is time-domain separated into the plurality of spectral bands with a plurality of wavelength-dependent delay lines.

32. The method of claim 31 wherein before time-domain separating the optical signal spectrum into the plurality of spectral bands, the optical signal is modulated to produce a modulated optical signal formed of a stream of light pulses, each pulse being representative of the optical signal spectrum.

33. The method of claim 32 wherein for each light pulse of the modulated optical signal, the optical signal spectrum is time-separated into the plurality of spectral bands.

34. The method of claim 33 wherein each wavelength-dependent delay line is a set of cascaded fiber gratings where each cascaded fiber grating is designed to a respective spectral band.

35. The method of claim 34 wherein each wavelength-dependent delay line is a WDM demultiplexer coupled to a plurality of optically terminated fiber lines.

36. The method of claim 25 wherein converting the output optical signal to an electrical signal sequentially representative of each isolated spectrally resolved portion of the optical signal spectrum is done by photo-detecting.

37. A method of monitoring an optical signal of a defined spectrum formed of a plurality of spectral bands, the method comprising:

using interferometry to cyclically scan the optical signal spectrum and isolate during each scan cycle multiple spectrally resolved portions of the optical signal spectrum each from a respective spectral band for producing an output optical signal;

filtering the output optical signal for separating the spectrally resolved portions of the optical signal spectrum isolated during each cycle to produce a plurality of intermediate optical signals each representative of a respective separated spectrally resolved portion of the optical signal spectrum;

converting the plurality of intermediate optical signals into a plurality of electrical signals; and sampling each one of the plurality of electrical signals for collecting one or more samples of each spectrally resolved portion of the optical signal spectrum separated during each cycle for continuous monitoring of the optical signal spectrum.

38. The method of claim 37 wherein an interferometer with a frequency response formed of narrow-band peaks is used for cyclically scanning the optical signal spectrum and isolate during each scan cycle multiple spectrally resolved portions of the optical signal spectrum.

39. The method of claim 38 wherein the interferometer with incrementally tuned in cycles so that each narrow-band peak of the interferometer frequency response cyclically scans a respective spectral band and isolate therefrom spectrally resolved portions of the optical signal spectrum.

40. The method of claim 39 wherein a plurality of optical filters is used to filter the output optical signal for separating the spectrally resolved portions of the optical signal spectrum isolated during each cycle.

41. The method of claim 40 wherein the optical filters are designed to partially overlapping wavelength regions along the optical signal spectrum, each wavelength region corresponding to a respective spectral band.

42. The apparatus of claim 41 wherein the plurality of optical filters consists of two WDM demultiplexers designed with complementary pass bands for separating the spectrally resolved portions of the optical signal spectrum isolated during each cycle to produce the plurality of intermediate optical signals.

43. The method of claim 37 wherein converting the plurality of intermediate optical signals into a plurality of electrical signals is done by photo-detecting.

44. The method of claim 37 wherein sampling each one of the plurality of electrical signals for collecting one or more samples of each spectrally resolved portion of the optical signal spectrum separated during each cycle is done in parallel.

45. The method of claim 37 wherein sampling each one of the plurality of electrical signals for collecting one or more samples of each spectrally resolved portion of the optical signal spectrum separated during each cycle is done in series.

* * * * *

UNITED STATES PATENT AND TRADEMARK OFFICE
CERTIFICATE OF CORRECTION

PATENT NO. : 6,493,088 B1
DATED : December 10, 2002
INVENTOR(S) : Rongqing Hui et al.

It is certified that error appears in the above-identified patent and that said Letters Patent is hereby corrected as shown below:

Column 15,
Line 24, change "$T_{sweep} = (2 * 10 * 1.5 * 1.5m) / 3*108 m/s + 20\mu sec;$" to
-- $T_{sweep} = (2 * 10 * 1.5 * 1.5m) / 3*10^8 m/s + 20\mu sec$ --

Column 17,
Line 7, the word "defined" has been omitted, change "spectrum" to -- defined spectrum --

Column 18,
Line 1, change "spectrum. and" to -- spectrum and --

Signed and Sealed this

Fifteenth Day of June, 2004

JON W. DUDAS
*Acting Director of the United States Patent and Trademark Office*